US012725862B2

(12) United States Patent
Dai et al.

(10) Patent No.: US 12,725,862 B2
(45) Date of Patent: Sep. 1, 2026

(54) ELECTROCHEMICAL DEVICE AND ELECTRONIC DEVICE

(71) Applicant: Dongguan Amperex Technology Limited, Dongguan (CN)

(72) Inventors: Wenjie Dai, Dongguan (CN); Xinhui Zhou, Dongguan (CN)

(73) Assignee: Dongguan Amperex Technology Limited, Dongguan (CN)

( * ) Notice: Subject to any disclaimer, the term of this patent is extended or adjusted under 35 U.S.C. 154(b) by 740 days.

(21) Appl. No.: 18/192,957

(22) Filed: Mar. 30, 2023

(65) Prior Publication Data

US 2023/0238626 A1 Jul. 27, 2023

Related U.S. Application Data

(63) Continuation of application No. PCT/CN2021/140364, filed on Dec. 22, 2021.

(51) Int. Cl.
*H01M 50/186* (2021.01)
*H01M 50/105* (2021.01)
(Continued)

(52) U.S. Cl.
CPC ....... *H01M 50/186* (2021.01); *H01M 50/105* (2021.01); *H01M 50/121* (2021.01);
(Continued)

(58) Field of Classification Search
CPC .................................................. H01M 50/105
See application file for complete search history.

(56) References Cited

U.S. PATENT DOCUMENTS

2005/0069764 A1* 3/2005 Kodama ............... H01M 10/02 429/185
2013/0216896 A1* 8/2013 Kim .................... H01M 50/124 429/163

(Continued)

FOREIGN PATENT DOCUMENTS

CN 203674276 U 6/2014
CN 207038562 U 2/2018

(Continued)

OTHER PUBLICATIONS

International Search Report issued on Aug. 1, 2022, in corresponding International Application No. PCT/CN2021/140364, 9 pages.

(Continued)

*Primary Examiner* — Alix E Eggerding
(74) *Attorney, Agent, or Firm* — Maier & Maier, PLLC

(57) ABSTRACT

An electrochemical device includes a housing including a body portion and a first portion, an electrode assembly, and a tab. In a second direction, the body portion includes a first wall and a second wall disposed opposite to each other. In a third direction, the body portion includes a first sidewall and a second sidewall disposed opposite to each other. The first portion includes a first seal edge and a second seal edge. The first seal edge is connected to the first sidewall and the second wall. The second seal edge is connected to the first seal edge. The second seal edge is disposed between the first seal edge and the first sidewall. The housing includes a first housing part and a second housing part disposed opposite to each other. The first housing part includes a first polymer layer. The second housing part includes a second polymer layer.

17 Claims, 15 Drawing Sheets

(51) Int. Cl.
*H01M 50/121* (2021.01)
*H01M 50/124* (2021.01)
*H01M 50/193* (2021.01)
*H01M 50/538* (2021.01)

(52) U.S. Cl.
CPC ....... *H01M 50/124* (2021.01); *H01M 50/193* (2021.01); *H01M 50/538* (2021.01)

(56) References Cited

U.S. PATENT DOCUMENTS

| | | | | |
|---|---|---|---|---|
| 2014/0099535 | A1* | 4/2014 | Chu | H01M 50/105 429/178 |
| 2015/0340731 | A1* | 11/2015 | Kim | H01M 4/525 429/246 |
| 2016/0351864 | A1* | 12/2016 | Yoon | H01M 50/136 |
| 2017/0141361 | A1 | 5/2017 | Shon et al. | |
| 2018/0342715 | A1* | 11/2018 | Ha | H01M 50/126 |
| 2020/0111999 | A1 | 4/2020 | Kim et al. | |

FOREIGN PATENT DOCUMENTS

| | | | |
|---|---|---|---|
| CN | 109997242 | A | 7/2019 |
| CN | 211182407 | U | 8/2020 |
| JP | 2000251855 | A | 9/2000 |
| JP | 2001325925 | A | 11/2001 |
| JP | 2002324524 | A | 11/2002 |
| KR | 1020160020759 | A | 2/2016 |
| WO | 2018100842 | A1 | 6/2018 |
| WO | 2021159390 | A1 | 8/2021 |

OTHER PUBLICATIONS

Office Action issued on Oct. 14, 2025, in corresponding Japanese Application No. 2024-537843, 9 pages.

Office Action issued on May 12, 2026, in corresponding Japanese Application No. 2024-537843, 10 pages.

* cited by examiner

ELECTROCHEMICAL DEVICE AND ELECTRONIC DEVICE

CROSS-REFERENCE TO RELATED APPLICATION

The present application is a continuation application of International Patent Application No. PCT/CN2021/140364, filed on Dec. 22, 2021, the content of which is incorporated herein by reference in its entirety.

TECHNICAL FIELD

This application relates to the field of energy storage, and in particular, to an electrochemical device and an electronic device containing the electrochemical device.

BACKGROUND

Electrochemical devices (such as a battery) are widely used in electronic products such as an electronic mobile device, an electric tool, and an electric vehicle, and people are imposing higher requirements on safety performance of the electrochemical devices.

In a process of manufacturing an electrochemical device, an upper sealing film and a lower sealing film need to be heat-sealed by a seal head to form a housing, so as to package an electrode assembly and an electrolyte solution in the housing. When mechanical abuse (such as dropping, collision, and vibration) occurs, the housing is at risk of electrolyte leakage or short circuits, thereby reducing the lifespan and safety of the electrochemical device.

SUMMARY

In view of the disadvantages of the prior art, it is necessary to disclose an electrochemical device.

In addition, it is necessary to provide an electronic device containing the electrochemical device.

This application provides an electrochemical device, including a housing, an electrode assembly, and a tab. The housing includes a body portion and a first portion. The electrode assembly is disposed in the body portion, and the tab is electrically connected to the electrode assembly and protrudes out of the housing. A direction in which the tab protrudes out of the electrode assembly is defined as a first direction. A thickness direction of the electrode assembly is a second direction. A direction perpendicular to the first direction and the second direction is a third direction. In the second direction, the body portion includes a first wall and a second wall disposed opposite to each other. In the third direction, the body portion includes a first sidewall and a second sidewall disposed opposite to each other. The first portion includes a first seal edge and a second seal edge. The first seal edge is connected to the first sidewall and the second wall. The second seal edge is connected to the first seal edge. The second seal edge is disposed between the first seal edge and the first sidewall. The housing includes a first housing part and a second housing part disposed opposite to each other. The first housing part includes a first polymer layer. The second housing part includes a second polymer layer. The first polymer layer and the second polymer layer are bonded to form a glue layer, and the glue layer is located in the first portion. In a cross-section perpendicular to the first direction, a first connection point is provided between the first seal edge and the first sidewall. The first sidewall extends outward from the first connection point along an outline of the first sidewall to form a first straight line. The glue layer is located in a space defined by the first portion and the first straight line.

By limiting the boundary of the glue layer, the impact force of the glue layer on the first connection point during mechanical abuse may be reduced, thereby reducing the risk of rupturing at the connection point and improving the mechanical strength of the first portion. In addition, the risk of the glue layer thrusting to the electrode assembly during mechanical abuse may be reduced, and the longevity and safety of the electrochemical device may be improved.

In some embodiments, a straight line passing through the first connection point and extending along the second direction is defined as a second straight line. The glue layer is located in a space defined by the first portion and the second straight line. By limiting the position of the glue layer, the impact force of the glue layer on the first connection point during mechanical abuse may be further reduces, and the risk of the glue layer thrusting to the electrode assembly may be further reduced. Moreover, in this way, a buffer space configured to accommodate the electrolyte solution is formed between the first straight line, the second straight line, and the second wall, thereby reducing the risk of leaking the electrolyte solution that bursts the first portion during mechanical abuse, and improving safety.

In some embodiments, a sum of a length of the first seal edge and a length of the second seal edge in the second direction is L, the thickness of the electrode assembly in the second direction is H, and $\frac{3}{4}H \le L \le \frac{5}{4}H$. The length falling within the foregoing range alleviates the decline in the sealing strength of the first portion caused by a deficient value of L, and in turn, reduces the risk of bursting the first portion by the electrode assembly or electrolyte solution; and also alleviates the problems of cost increase and energy density decline that may be caused by an excessive value of L.

In some embodiments, the second seal edge includes a first end connected to the first seal edge and a second end disposed opposite to the first end. The electrode assembly has a first plane perpendicular to the second direction. In the second direction, thicknesses of the electrode assembly between two sides of the first plane are equal. The first plane is located between the second end and the second wall. Such an arrangement reduces the risk of detaching the first portion from the first sidewall when the second end is located at a relatively low position (that is, the second seal edge is relatively long).

In some embodiments, the first seal edge includes a first region and a second region. The second region is connected between the first region and the second seal edge. A thickness of the first region is greater than a thickness of the second region.

In some embodiments, in the cross-section perpendicular to the first direction, a second connection point is provided between the first region and the second region. The electrode assembly has a first plane perpendicular to the second direction. In the second direction, thicknesses of the electrode assembly between two sides of the first plane are equal. The second connection point is located between the first plane and the second wall. By limiting the position of the second connection point, the first region is downsized in the second direction, and the second region with greater sealing strength is upsized in the second direction, thereby increasing the sealing strength of the first portion.

In some embodiments, in a cross-section perpendicular to the first direction, a third connection point is provided between the second region and the second seal edge. The electrode assembly has a second plane perpendicular to the second direction. In the second direction, an electrode assembly thickness located between the second plane and the second wall is ¾ of a total thickness of the electrode assembly. In the second direction, the third connection point is located between the second plane and the second wall, thereby reducing the risk of detaching the first portion from the first sidewall when the third connection point is located at a relatively high position (that is, the second seal edge is relatively long).

In some embodiments, the first seal edge includes a third region. The first region is connected between the second region and the third region. The first polymer layer in the third region is not bonded to the second polymer layer. In a cross-section perpendicular to the first direction, a first connection point is provided between the first seal edge and the first sidewall. A straight line passing through the first connection point and extending along the second direction is defined as a second straight line, and the third region is disposed on one side of the second straight line. The third region disposed further reduces the impact force of the glue layer on the first connection point during mechanical abuse, and further reduces the risk of the glue layer thrusting to the electrode assembly. Moreover, the third region forms a buffer space configured to accommodate the electrolyte solution, thereby reducing the risk of leaking the electrolyte solution that bursts the first portion during mechanical abuse, and improving safety.

In some embodiments, the first housing part further includes a first metal layer stacked together with the first polymer layer. The second housing part further includes a second metal layer stacked together with the second polymer layer. In the cross-section perpendicular to the first direction, an area of a part that is of the third region and that is located between the first metal layer and the second metal layer is $A_1$, an area of a part that is of the first region and that is located between the first metal layer and the second metal layer is $A_2$, and $0.5 \le A_1:A_2 \le 3$. Such a ratio relationship avoids a deficient ratio of $A_1$ to $A_2$ that makes it difficult to bend the first portion at a junction between the first portion and the first sidewall. In addition, after the first portion is bent, the electrochemical device is downsized in the third direction, thereby increasing a volumetric energy density. Such a ratio relationship also avoids an excessive ratio of $A_1$ to $A_2$ that poses a risk of reducing the sealing strength of the first portion.

In some embodiments, in the cross-section perpendicular to the first direction, the glue layer in the first region includes an angular point, and the angular point protrudes toward the third region. The first housing part further includes a first metal layer stacked together with the first polymer layer, and the second housing part further includes a second metal layer stacked together with the second polymer layer. A third straight line is defined parallel to the second straight line. The third straight line passes through the angular point. At a first intersection, the third straight line intersects a boundary line between the first metal layer of the first seal edge and the first polymer layer. At a second intersection, the third straight line intersects a boundary line between the second metal layer of the first seal edge and the second polymer layer. A distance from the first intersection to the second intersection is $L_3$, a distance from the angular point to a boundary line between the first region and the second region is $L_4$, and $0.1 \le L_3/L_4 \le 0.6$. Such a relationship avoids a deficient or excessive ratio of $L_3$ to $L_4$ that leads to insufficient heat sealing in the second region, thereby increasing the sealing strength of the first portion.

In some embodiments, the electrochemical device further includes a first bonding piece. The first bonding piece is configured to bond the second seal edge to an outer surface of the first sidewall, thereby reducing the risk of detaching the first portion.

In some embodiments, the electrochemical device further includes a second bonding piece. The second bonding piece is configured to bond an inner surface of the first sidewall to the electrode assembly. This reduces the risk of wobbling of the electrode assembly in the housing in the third direction during mechanical abuse, and in turn, reduces the impact of the electrode assembly on the first portion of the housing, and improves safety.

In some embodiments, the electrochemical device further includes a third bonding piece. The third bonding piece is configured to bond an inner surface of at least one of the first wall or the second wall to the electrode assembly. This reduces the risk of wobbling of the electrode assembly in the housing in the second direction during mechanical abuse, and in turn, reduces the impact of the electrode assembly on the second portion of the housing, and improves safety.

In some embodiments, the electrode assembly is a of wound structure. The electrode assembly includes a first electrode plate, a second electrode plate, and a separator disposed between the first electrode plate and the second electrode plate. The first electrode plate includes a first current collector and a first active material layer disposed on the first current collector. The first current collector includes a first surface. An outer surface of an outermost circle of the electrode assembly is the first surface. The first surface being the outer surface reduces the probability of detachment of an active material disposed on the outer surface of the electrode assembly even if the electrode assembly is impacted by the glue layer. Moreover, the first current collector can increase hardness of the electrode assembly and serve to protect the electrode assembly.

In some embodiments, the electrode assembly is of a wound structure. The electrode assembly includes a first electrode plate, a second electrode plate, and a separator disposed between the first electrode plate and the second electrode plate. An outermost circle of the electrode assembly is the separator. The separator can increase friction between the electrode assembly and the housing, thereby increasing a bonding force between the electrode assembly and the first bonding piece or second bonding piece, and in turn, fixing the electrode assembly in the housing more firmly. In addition, the separator can form a protection layer to avoid short-circuit hazards caused by wear and tear of the electrode plate inside this part of separator and increase the capability of the electrode assembly in resisting mechanical shocks.

In some embodiments, in the first direction, the body portion further includes a first end wall and a second end wall disposed opposite to each other. The housing further includes a second portion connected to the first end wall. The tab protrudes out of the housing from an edge of the second portion. The second portion can close the body portion in the first direction, thereby further reducing the risk of electrolyte leakage.

In some embodiments, in the second direction, the second portion is closer to the second wall than the first wall. In the second direction, the first end wall includes a first end face and a second end face that are located on two sides of the tab respectively. The first end face is connected to the second portion and the first wall, and the second end face is connected to the second portion and the second wall.

In some embodiments, the electrochemical device further includes a fourth bonding piece. The fourth bonding piece is configured to bond the first end face to the edge of the second portion. The fourth bonding piece may be configured to cover a metal layer exposed at the edge of the second portion, thereby improving safety.

In some embodiments, the first polymer layer includes a first polymer material. The second polymer layer includes a second polymer material. The first polymer material and the second polymer material each are at least one independently selected from polypropylene, a propylene copolymer, polyethylene, or polymethyl methacrylate.

This application further provides an electronic device, including the electrochemical device.

Figure 1:
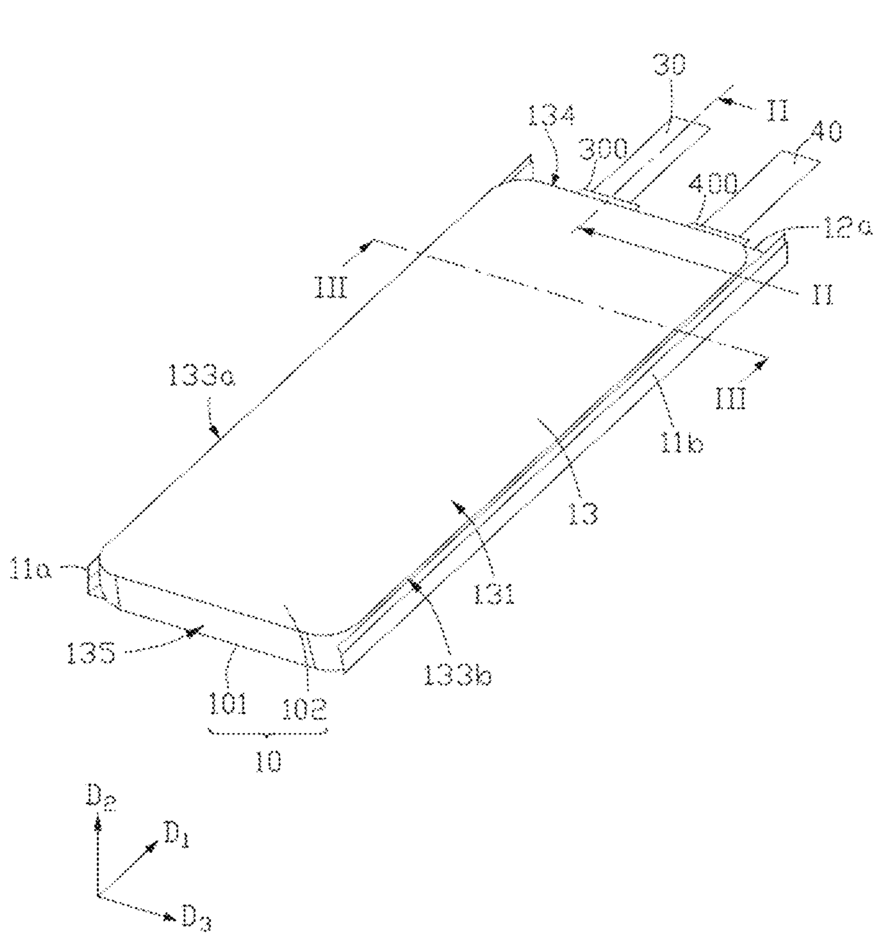
FIG. 1 is a three-dimensional diagram of an electrochemical device according to an embodiment of this application.

This application is further described below with reference to the following specific embodiments and the foregoing drawings.

DETAILED DESCRIPTION

The following describes the technical solutions in the embodiments of this application clearly and thoroughly. Evidently, the described embodiments are merely a part of but not all of the embodiments of this application. Unless otherwise defined, all technical and scientific terms used herein have the same meanings as usually understood by a person skilled in the technical field of this application. The terms used in the specification of this application are merely intended for describing specific embodiments but not intended to limit this application.

The following describes the embodiments of this application in detail. However, this application may be embodied in many different forms, and is in no way construed as being limited to the illustrative embodiments described herein. Rather, the illustrative embodiments are provided in order to impart this application thoroughly in detail to those skilled in the art.

In addition, for brevity and clarity, the size or thickness of various components and layers in the drawings may be scaled up. Throughout the text, the same reference numerical means the same element. As used herein, the term "and/or" includes any and all combinations of one or more related items preceding and following the term. In addition, understandably, when an element A is referred to as "connecting" an element B, the element A may be directly connected to the element B, or an intermediate element C may exist through which the element A and the element B can be connected to each other indirectly.

Further, the term "may" used in describing an embodiment of this application indicates "one or more embodiments of this application".

The technical terms used herein is intended to describe specific embodiments but not intended to limit this application. Unless otherwise expressly specified in the context, a noun used herein in the singular form includes the plural form thereof. Further, understandably, the terms "include", "comprise", and "contain" used herein mean existence of the feature, numerical value, step, operation, element and/or component under discussion, but do not preclude the existence or addition of one or more other features, numerical values, steps, operations, elements, components, and/or any combinations thereof.

Space-related terms, such as "on", may be used herein for ease of describing the relationship between one element or feature and other element (elements) or feature (features) as illustrated in the drawings. Understandably, the space-related terms are intended to include different directions of a device or apparatus in use or operation in addition to the directions illustrated in the drawings. For example, if a device in the drawing is turned over, an element described as "above" or "on" another element or feature will be oriented "under" or "below" the other element or feature. Therefore, the illustrative term "on" includes both an up direction and a down direction. Understandably, although the terms such as first, second, third may be used herein to describe various elements, components, regions, layers and/or parts, such elements, components, regions, layers and/or parts are not limited by the terms. Such terms are intended to distinguish one element, component, region, layer or part from another element, component, region, layer, or part. Therefore, a first element, a first component, a first region, a first layer, or a first part mentioned below may be referred to as a second element, a second component, a second region, a second layer, or a second part, without departing from the teachings of the illustrative embodiments.

Figure 2:
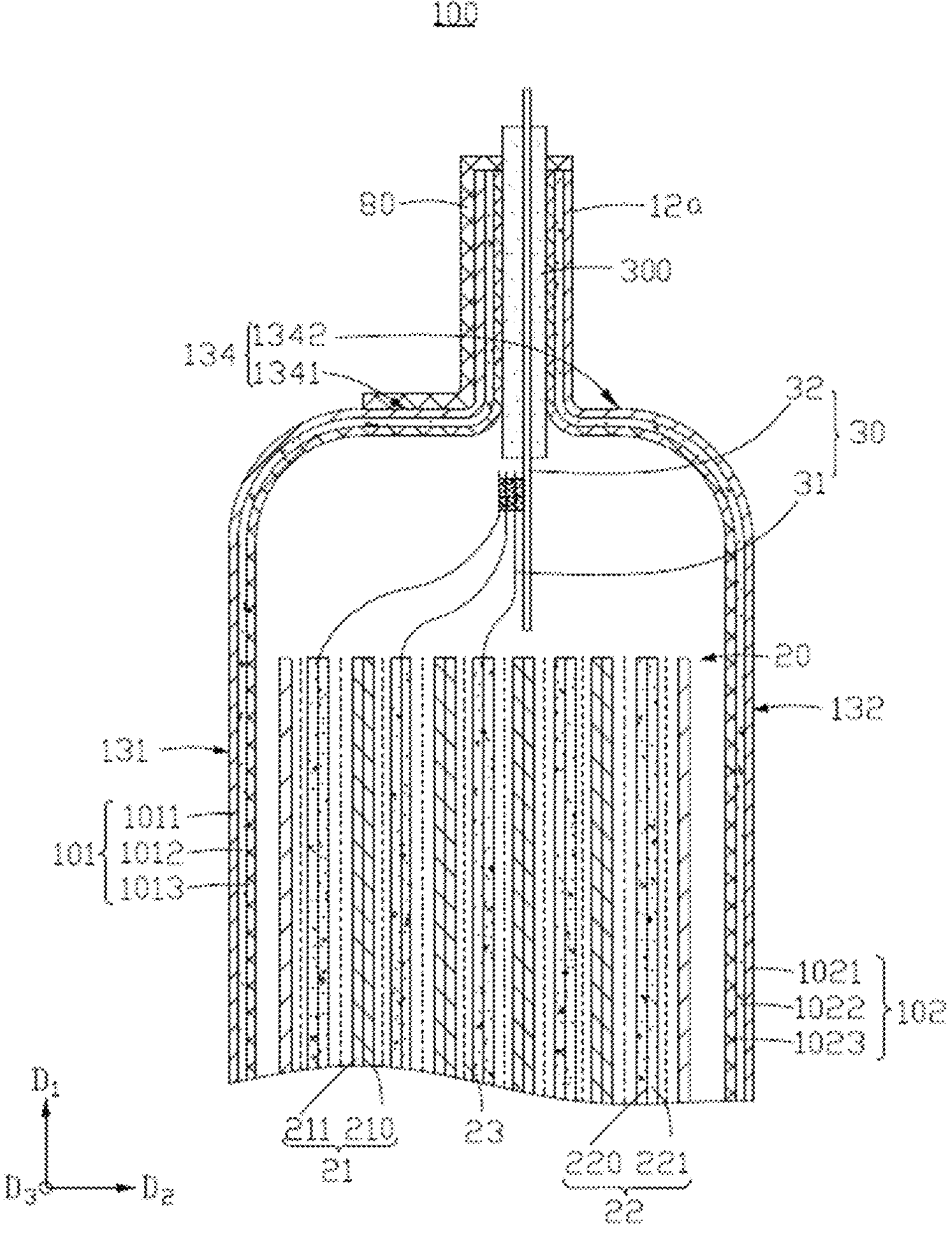
FIG. 2 is a sectional view of the electrochemical device shown in FIG. 1 and sectioned along an II-II line.
Figure 3:
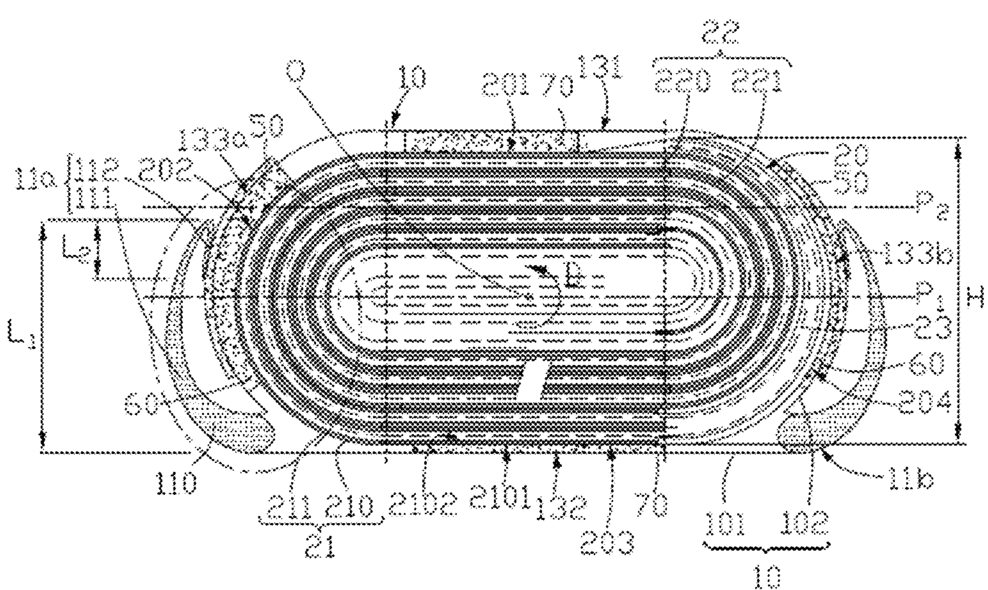
FIG. 3 is a sectional view of the electrochemical device shown in FIG. 1 and sectioned along an III-III line.
Figure 3:

Referring to FIG. 1 to FIG. 3, an embodiment of this application provides an electrochemical device 100, including a housing 10, an electrode assembly 20, and an electrolyte solution (not shown in the drawings), a first tab 30, and a second tab 40. The electrode assembly 20 is located in the housing 10. In some embodiments, the electrochemical device 100 may include an electrolyte solution (not shown in the drawing), and the electrolyte solution is located in the housing 10. Both the first tab 30 and the second tab 40 are electrically connected to the electrode assembly 20, and protrude out of the housing 10. The first tab 30 and the second tab 40 may be connected to an external component (not shown in the drawing).

As shown in FIG. 3, in some embodiments, the electrode assembly 20 is of a wound structure, and includes a first electrode plate 21, a second electrode plate 22, and a separator 23. The separator 23 is disposed between the first electrode plate 21 and the second electrode plate 22. The first electrode plate 21, the separator 23, and the second electrode plate 22 are stacked and wound to form the electrode assembly 20. The first electrode plate 21 includes a first current collector 210 and a first active material layer 211 provided on the first current collector 210. The second electrode plate 22 includes a second current collector 220 and a second active material layer 221 provided on the second current collector 220. As shown in FIG. 3, the electrode assembly 20 has a winding central axis O perpendicular to the paper surface. The winding direction D is a direction of counterclockwise rotation around the winding central axis O shown in FIG. 3. In the winding direction D, the electrode assembly 20 includes a first section 201, a first bend section 202, a second section 203, and a second bend section 204 that are connected sequentially. The first section 201 and second section 203 may be flat straight sections that are disposed opposite to each other. In other embodiments, the first section 201 and the second section 203 may be bent sections, but without being limited in this application.

As shown in FIG. 2, in some embodiments, the first tab 30 includes a plurality of connecting portions 31 and one adapter portion 32. Each connecting portion 31 is connected to the first current collector 210. The adapter portion 32 is connected to the connecting portion 31, and protrudes out of the housing 10. The connecting portion 31 may be integrally formed together with the first current collector 210 (that is, the connecting portion 31 is formed by cutting the first current collector 210) or may be fastened by welding. The adapter portion 32 is fastened to the plurality of connecting portions 31 by welding.

In some embodiments, the electrode assembly 20 may be a stacked structure, in which the first electrode plate 21, the separator 23, and the second electrode plate 22 are stacked in sequence to form the electrode assembly 20.

The first electrode plate 21 may be a positive electrode plate or a negative electrode plate. Correspondingly, the first current collector 210 may be a positive current collector or negative current collector, and the first active material layer 211 may be a positive active material layer or negative active material layer. In some embodiments, the first electrode plate 21 is a positive electrode plate, and the second electrode plate 22 is a negative electrode plate.

The positive current collector may be an aluminum foil or nickel foil, and the negative current collector may be at least one of a copper foil, a nickel foil, or a carbon-based current collector.

The positive active material layer includes a positive active material. The positive active material includes a compound in favor of reversibly intercalating and deintercalating metal ions (such as lithium ions and sodium ions, with lithium ions used as an example below), where the compound is a lithiated intercalation compound. In some embodiments, the positive active material may include a lithium transition metal composite oxide. The lithium transition metal composite oxide contains lithium and at least one element selected from cobalt, manganese, or nickel. In some embodiments, the positive active material is at least one selected from lithium cobalt oxide ($LiCoO_2$), lithium nickel-cobalt-manganese ternary material (NCM), lithium nickel-cobalt-aluminum ternary material (NCA), lithium manganese oxide ($LiMn_2O_4$), lithium nickel manganese oxide ($LiNi_{0.5}Mn_{1.5}O_4$), or lithium iron phosphate ($LiFePO_4$).

The negative active material layer contains a negative active material, and adopts a negative active material that is known in the art and capable of reversible deintercalation of active ions, without being limited in this application. For example, the negative active material may include, but without being limited to, one of or any combination of graphite, soft carbon, hard carbon, carbon fiber, mesocarbon microbeads, silicon-based material, tin-based material, lithium titanium oxide, or other lithium-alloyable metals. The graphite may be one of or any combination of artificial graphite, natural graphite, or modified graphite. The silicon-based material may be one of or any combination of simple-substance silicon, a silicon-oxygen compound, a silicon-carbon composite, a silicon alloy, or the like. The tin-based material may be one of or any combination of simple-substance tin, a tin-oxide compound, a tin alloy, or the like.

The separator 23 includes at least one of polyethylene, polypropylene, polyvinylidene fluoride, polyethylene terephthalate, polyimide, or aramid fiber. For example, the polyethylene includes at least one of high-density polyethylene, low-density polyethylene, or ultra-high-molecular-weight polyethylene. The polyethylene and polypropylene are highly effective in reducing the risk of short circuits, and improve stability of the electrochemical device 100 by virtue of a turn-off effect.

Referring to FIG. 1 and FIG. 3, the housing 10 includes a body portion 13 and a first portion 11*a*. The electrode assembly 20 is disposed in the body portion 13. The direction in which the first tab 30 protrudes out of the electrode assembly 20 (that is, a direction from the electrode assembly 20 to the first tab 30) is defined as a first direction $D_1$. A thickness direction of the electrode assembly 20 is a second direction $D_2$. A direction perpendicular to the first direction $D_1$ and the second direction $D_2$ is a third direction $D_3$. In some embodiments, when the electrode assembly 20 is of a wound structure, the first direction $D_1$ is a direction of the winding central axis O. The second direction $D_2$ is a direction of stacking all layers of the first electrode plate 21 in the first section 201 or the second section 203. When the first section 201 and the second section 203 are flat straight sections disposed opposite to each other, the second direction $D_2$ is a direction that is also perpendicular to the surface of the first section 201 or the surface of the second section 203. The third direction is a direction of extending the first electrode plate 21 in the first section 201 or the second section 203. In some embodiments, when the electrode assembly 20 is a stacked structure, the second direction $D_2$ is a direction of stacking all layers of the first electrode plate 21.

In the second direction $D_2$, the body portion 13 includes a first wall 131 and a second wall 132 disposed opposite to each other. The surface on which the first wall 131 is located extends in the first direction $D_1$ and the third direction $D_3$.

The surface on which the second wall 132 is located extends in the first direction $D_1$ and the third direction $D_3$. In the third direction $D_3$, the body portion 13 includes a first sidewall 133a and a second sidewall 133b disposed opposite to each other. In the second direction $D_2$, the first sidewall 133a is connected between the first wall 131 and the second wall 132, and the second sidewall 133b is connected between the first wall 131 and the second wall 132. The first portion 11a is bent and then disposed on the first sidewall 133a, thereby downsizing the electrochemical device 100 in the third direction $D_3$ and increasing the space efficiency and energy density. In the first direction $D_1$, the body portion 13 includes a first end wall 134 and a second end wall 135 disposed opposite to each other. The surface on which the first end wall 134 is located extends in the second direction $D_2$ and the third direction $D_3$. The surface on which the second end wall 135 is located extends in the second direction $D_2$ and the third direction $D_3$. In the second direction $D_2$, the first end wall 134 is connected between the first wall 131 and the second wall 132, and the second end wall 135 is connected between the first wall 131 and the second wall 132. In some embodiments, the housing 10 further includes a third portion 11b. The third portion 11b is connected to the second sidewall 133b.

As shown in FIG. 3, in some embodiments, in the second direction $D_2$, the first wall 131 and the first section 201 are disposed opposite to each other, and the second wall 132 and the second section 203 are disposed opposite to each other. In the third direction $D_3$, the first sidewall 133a and the first bend section 202 are disposed opposite to each other, and the second sidewall 133b and the second bend section 204 are disposed opposite to each other. The phrase "two elements disposed opposite to each other in a given direction" means that the projections of the two elements in this direction are mostly coincident. After being chemically formed, the electrochemical device 100 needs to be vacuumized to expel the gas and/or excessive electrolyte solution produced during the chemical formation. Therefore, the first sidewall 133a and the second sidewall 133b are arc-shaped to some extent due to the shape of the sidewall of the electrode assembly 20. That is, both the first sidewall 133a and the second side all 133b may be arc-shaped faces.

Referring to FIG. 1 and FIG. 2, the housing 10 may further include a second portion 12a. The second portion 12a is connected to the first end wall 134. In this case, both the first tab 30 and the second tab 40 protrude out of the housing 10 from the edge of the second portion 12a. When the first tab 30 includes a connecting portion 31 and an adapter portion 32, the adapter portion 32 protrudes out of the housing 10 from the edge of the second portion 12a. In some embodiments, the second portion 12a does not need to be bent. That is, the second portion 12a is approximately perpendicular to the first end wall 134. In this case, the direction in which the first tab 30 protrudes out of the housing 10 is the first direction $D_1$. In other embodiments, the second portion 12a may be bent and attached to the first end wall 134, thereby downsizing the electrochemical device 100 in the first direction $D_1$ and increasing the space efficiency and energy density. Considering that the second portion 12a is bent and attached to the first end wall 134, a part that is of the first tab 30 and that is disposed in the second portion 12a (such as the adapter portion 32) is also bent and attached to the first end wall 134. In this case, the direction of extending the adapter portion 32 in the second portion 12a is perpendicular to the first direction $D_1$.

In some embodiments, the electrochemical device 100 further includes a first insulation adhesive 300 and a second insulation adhesive 400. The first insulation adhesive 300 is configured to hermetically connect the first tab 30 and the second portion 12a, and a part of the first insulation adhesive 300 is disposed outside the second portion 12a. The second insulation adhesive 400 is configured to hermetically connect the second tab 40 and the second portion 12a, and a part of the second insulation adhesive 400 is disposed outside the second portion 12a.

Figure 4:
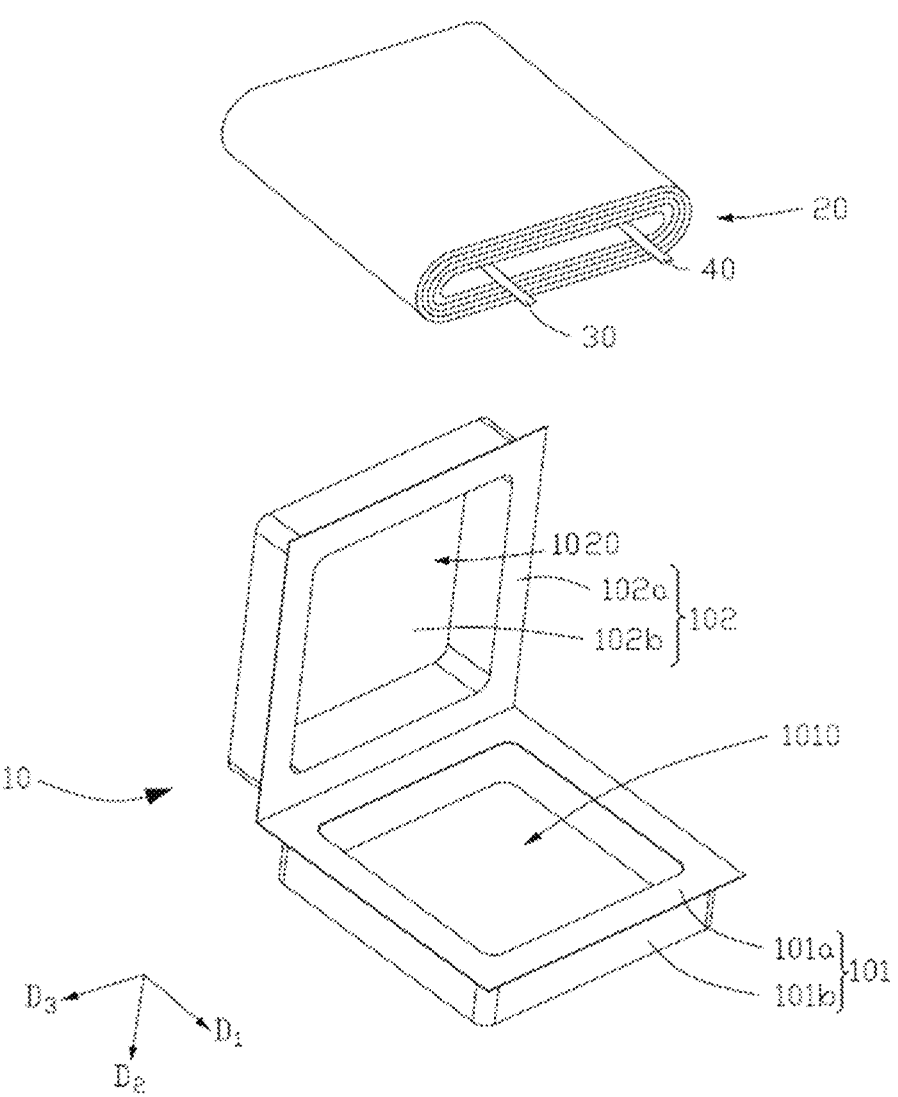
FIG. 4 is a three-dimensional diagram of an electrochemical device shown in FIG. 1 before packaging.

Refer to FIG. 4, which is a schematic structural diagram of an electrochemical device 100 before packaging. The housing 10 includes a first housing part 101 and a second housing part 102 that are disposed opposite to each other in the second direction $D_2$. In some embodiments, the second housing part 102 is folded against the first housing part 101. When the housing 10 includes a first portion Ila, a second portion 12a, and a third portion 11b, the corresponding electrode assembly 20 at the fold positions of the first housing part 101 and the second housing part 102 is disposed away from the endings of the first tab 30 and the second tab 40. The first housing part 101 includes a first housing region 101a and a second housing region 101b that are connected to each other. Three lateral edges of the second housing region 101b are surrounded by the first housing region 101a. The second housing part 102 includes a third housing region 102a and a fourth housing region 102b that are connected to each other. Three lateral edges of the fourth housing region 102b are surrounded by the third housing region 102a. The housing 10 is formed by fitting and sealing the first housing part 101 and the second housing part 102 together. Specifically, the second housing region 101b of the first housing part 101 contains a first recess 1010, and the fourth housing region 102b of the second housing part 102 contains a second recess 1020. In this way, after the first housing part 101 and the second housing part 102 are fitted and sealed together, the first housing region 101a is connected to the third housing region 102a to form the first portion 11a, the second portion 12a, and the third portion 11b. The second housing region 101b and the fourth housing region 102b combine into a body portion 13 configured to accommodate the electrode assembly 20. Alternatively, in other embodiments, the second housing part 102 may be a flat-plate structure. After the first housing part 101 and the second housing part 102 are fitted and sealed together, the first recess 1010 is closed by the fourth housing region 102b of the second housing part 102 to form the body portion 13.

Figure 5:
FIG. 5 is a sectional view of a first housing part of the electrochemical device shown in FIG. 4.
Figure 5:
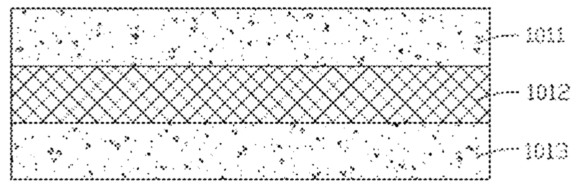
Figure 5:

The first housing part 101 and the second housing part 102 may be obtained by folding a single packaging film. In this way, the materials of both the first housing part 101 and the second housing part 102 are multi-layer sheets. As shown in FIG. 5, the first housing part 101 may include a first protection layer 1011, a first metal layer 1012, and a first polymer layer 1013 that are stacked in sequence. The first polymer layer 1013 is closer to the electrode assembly 20 than the first protection layer 1011. The first protection layer 1011 may be made of polymer resin, and may be configured to protect the first metal layer 1012, reduce the risk of damage to the first metal layer 1012 caused by an external force, defer air permeation from an external environment, and maintain a normal operation environment inside the electrochemical device 100. In some embodiments, the material of the first protection layer 1011 may be at least one selected from ethylene terephthalate, polybutylene terephthalate, polyvinylidene fluoride, polytetrafluoroethylene, polypropylene, polyamide, or polyimide. The thickness of the first protection layer 1011 may range from 15 μm to 35 μm. The first metal layer 1012 may be configured to defer moisture penetration from the external environment, and reduce the damage to the electrode assembly 20 caused by the external force. In some embodiments, the first metal layer 1012 may be an aluminum foil layer or a steel foil layer. The thickness of the first metal layer 1012 may range from 20 μm to 120 μm. The first polymer layer 1013 is fusible by heating, and suitable for sealing, and can reduce the risk of the multi-layer sheet being dissolved or swollen by the organic solvent in the electrolyte solution. The first polymer layer 1013 can also reduce the risk of corrosion of the metal layer caused by the contact between an electrolyte in the electrolyte solution and the first metal layer 1012. In some embodiments, the first polymer material 1013 includes a polymer material. The polymer material may be at least one selected from polypropylene, a propylene copolymer, polyethylene, or polymethyl methacrylate. The thickness of the first polymer layer 1013 may range from 10 μm to 40 μm. In some embodiments, the first housing part 101 may further include a first bonding layer (not shown in the drawing) and a second bonding layer (not shown). The first bonding layer is provided between the first protection layer 1011 and the first metal layer 1012, and may be configured to bond the first protection layer 1011 and the first metal layer 1012. The second bonding layer is provided between the first metal layer 1012 and the first polymer layer 1013, and may be configured to bond the first metal layer 1012 and the first polymer layer 1013.

Figure 6:
FIG. 6 is a sectional view of a second housing part of the electrochemical device shown in FIG. 4.
Figure 6:
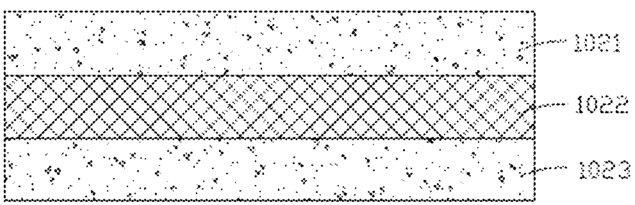
Figure 6:

As shown in FIG. 6, the second housing part 102 may include a second protection layer 1021, a second metal layer 1022, and a second polymer layer 1023 that are stacked in sequence. Understandably, when the first housing part 101 and the second housing part 102 may be obtained by folding a single packaging film, the materials of the second protection layer 1021, the second metal layer 1022, and the second polymer layer 1023 are the same as the materials of the first protection layer 1011, the first metal layer 1012, and the first polymer layer 1013 respectively, details of which are omitted here.

Figure 11:
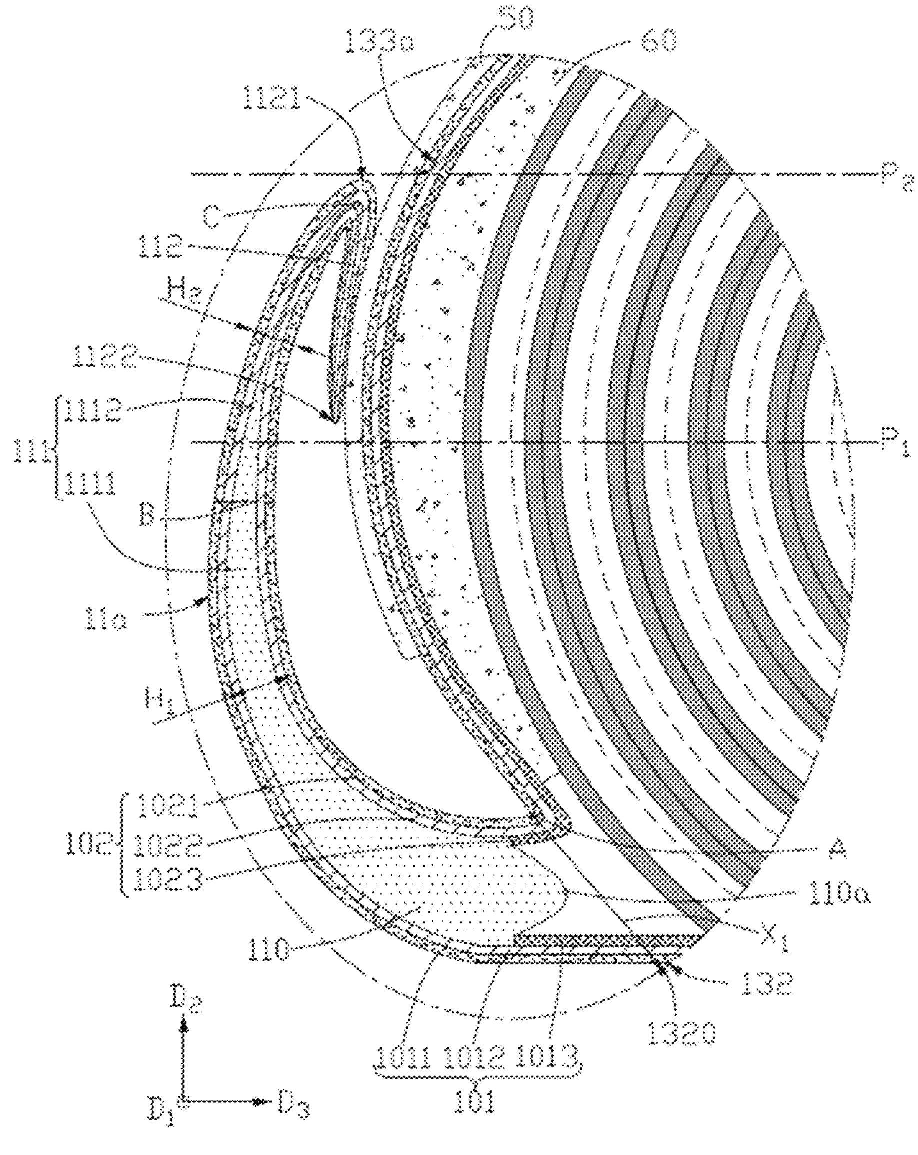
FIG. 11 is a close-up view of the electrochemical device shown in FIG. 3.
Figure 12:
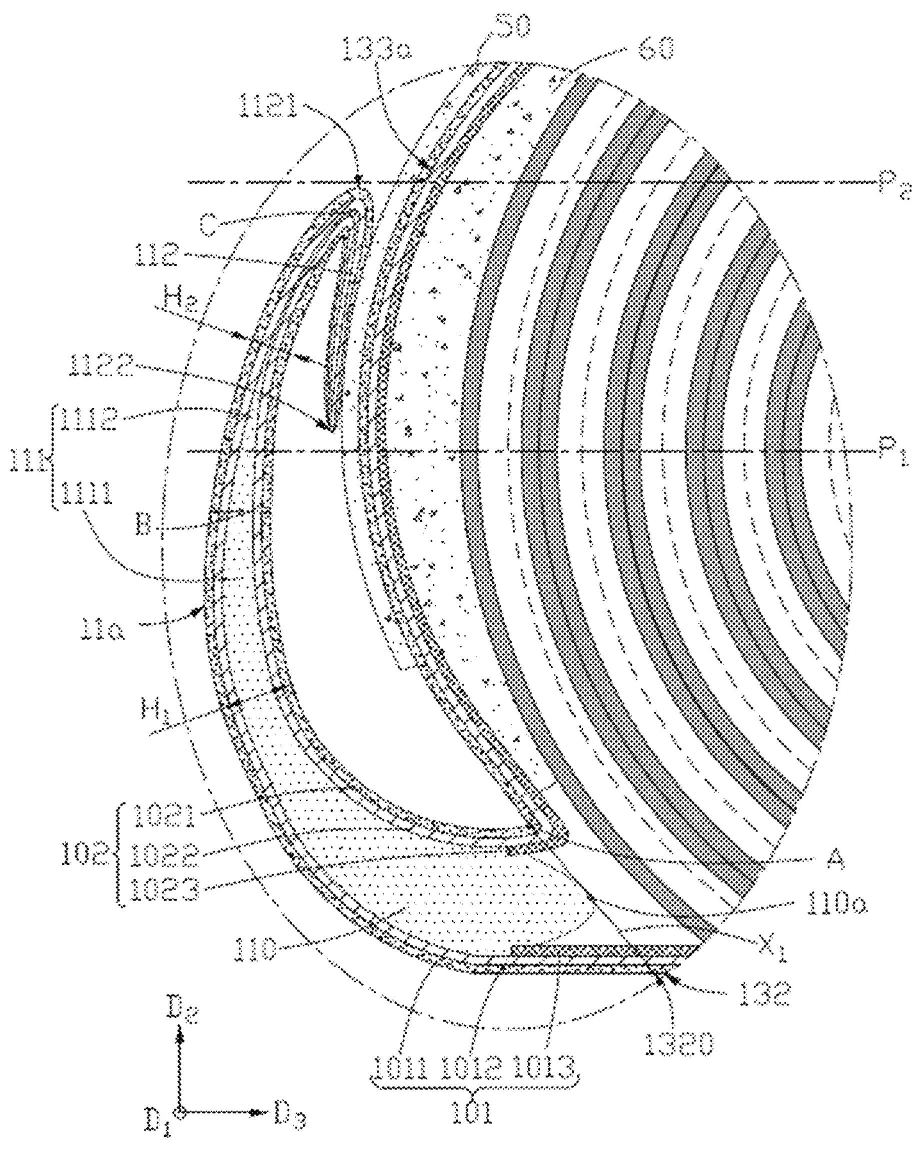
FIG. 12 is a close-up view of the electrochemical device shown in FIG. 3 according to other embodiments.

As shown in FIG. 5 and FIG. 6, during preparation of the housing 10, a given temperature and pressure may be applied to the edges of the first housing part 101 and the second housing part 102 simultaneously by using a seal head of a sealing device, so that the first polymer layer 1013 and second polymer layer 1023 are fused and bonded together to obtain a first glue layer 110 (shown in FIG. 3). The first glue layer 110 is located in the first portion 11*a*. Referring to FIG. 3, FIG. 11, and FIG. 12 together, the first polymer layer 1013 and the second polymer layer 1023 are not only located in the first portion 11*a*, but also located in the body portion 13. The first polymer layer 1013 and the second polymer layer 1023 are separated from each other inside the body portion 13 rather than bonded together. Therefore, the first glue layer 110 in this application means a common part of the first polymer layer 1013 and the second polymer layer 1023, in which the two polymer layers are fused and bonded together in the first portion 11*a*. The region in which the first polymer layer 1013 and the second polymer layer 1023 are separated from each other rather than bonded together is not included in the first glue layer 110. For ease of distinguishing, the first glue layer 110 in FIG. 11 and FIG. 12 is indicated by a different filler pattern in contrast to the first polymer layer 1013 and the second polymer layer 1023 that are not bonded together. However, understandably, the different filler pattern does not mean that the first glue layer 110 is made of a different polymer in contrast to the first polymer layer 1013 and the second polymer layer 1023 that are not bonded together, and there is no clear boundary between the first glue layer and the polymer layers that are not bonded together. Fusible to form the first glue layer 110, the first portion 11*a* can thereby close, in the third direction $D_3$, the body portion 13 configured to accommodate the electrode assembly 20, and reduce the risk of electrolyte leakage.

When the housing 10 further includes a second portion 12*a* and a third portion 11*b*, the second portion 12*a* contains a second glue layer (not shown in the drawing) obtained by fusing and bonding the first polymer layer 1013 and the second polymer layer 1023 together. The second portion 12*a* can close the body portion 13 in the first direction $D_1$, thereby reducing the risk of electrolyte leakage. When the first insulation adhesive 300 and the second insulation adhesive 400 are disposed, the first insulation adhesive 300 is further configured to reduce the risk of short circuits between the first tab 30 and the first metal layer 1012 or second metal layer 1022. In addition, during sealing, the first insulation adhesive 300 is fused and bonded to the first polymer layer 1013 and the second polymer layer 1023 to reduce the risk of electrolyte leakage. Similarly, the second insulation adhesive 400 is further configured to reduce the risk of short circuits between the second tab 40 and the first metal layer 1012 or second metal layer 1022. In addition, during sealing, the second insulation adhesive 400 is fused and bonded to the first polymer layer 1013 and the second polymer layer 1023 to reduce the risk of electrolyte leakage. The third portion 11*b* may further contain a third glue layer (not shown in the drawing) obtained by fusing and bonding the first polymer layer 1013 and the second polymer layer 1023 together.

Figure 10:
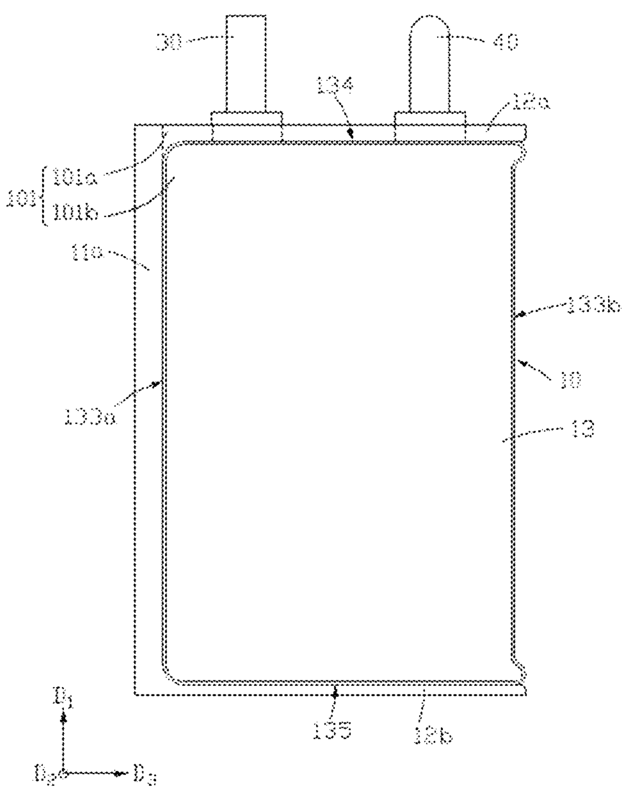
FIG. 10 is a schematic structural diagram of a first portion of an electrochemical device before bending according to other embodiments of this application.

As shown in FIG. 10, in other embodiments, the housing 10 does not include the third portion 11*b*. The housing 10 further includes a fourth portion 12*b* in addition to the first portion 11*a* and the second portion 12*a*. The fourth portion 12*b* is connected to the second end wall 135. In this case, both the first tab 30 and the second tab 40 may protrude out of the second portion 12*a*. Alternatively, both the first tab 30 and the second tab 40 may protrude out of the fourth portion 12*b*. Alternatively, the first tab 30 protrudes out of the second portion 12*a*, and the second tab 40 protrudes out of the fourth portion 12*b*. In this case, before sealing, the fold position of the first housing part 101 and the second housing part 102 is located on a second sidewall 133*b* opposite to the first portion 11*a*.

In other embodiments, before sealing, the first housing part 101 and the second housing part 102 are not obtained by folding a single packaging film, but are two independent packaging films. Four edges of one of the two packaging films are sealed together with four edges of the other to obtain the first portion 11*a*, the second portion 12*a*, the third portion 11*b*, and the fourth portion 12*b* at a time.

Figure 7:
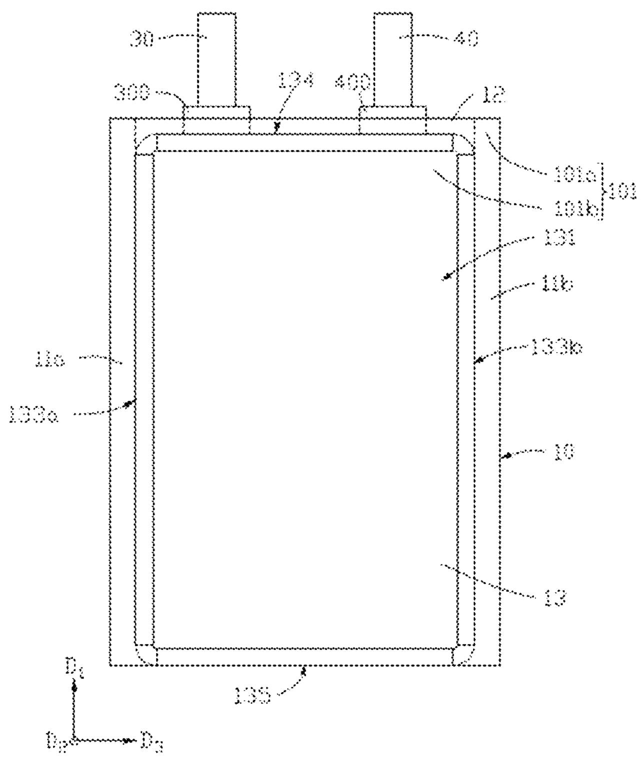
FIG. 7 is a front view of a first portion of the electrochemical device shown in FIG. 1 before bending.
Figure 8:
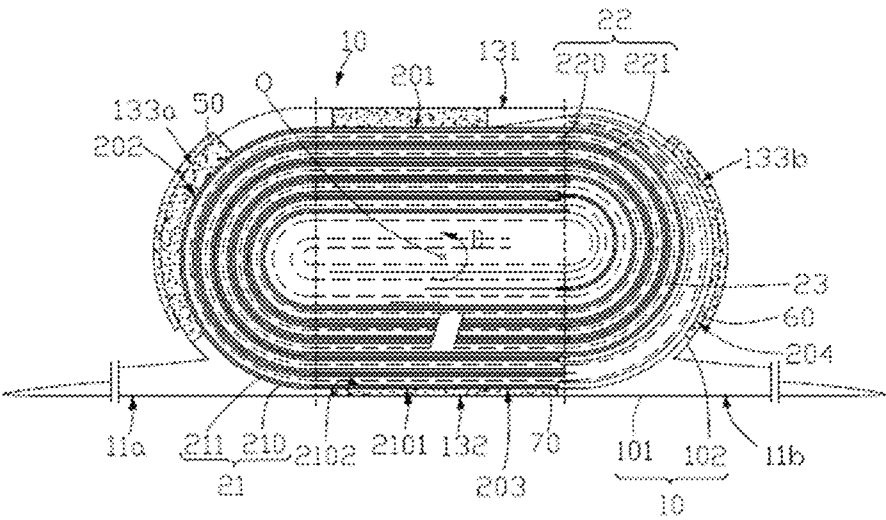
FIG. 8 is a sectional view of a first portion of the electrochemical device shown in FIG. 7 before bending.
Figure 8:
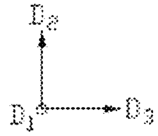
Figure 9:
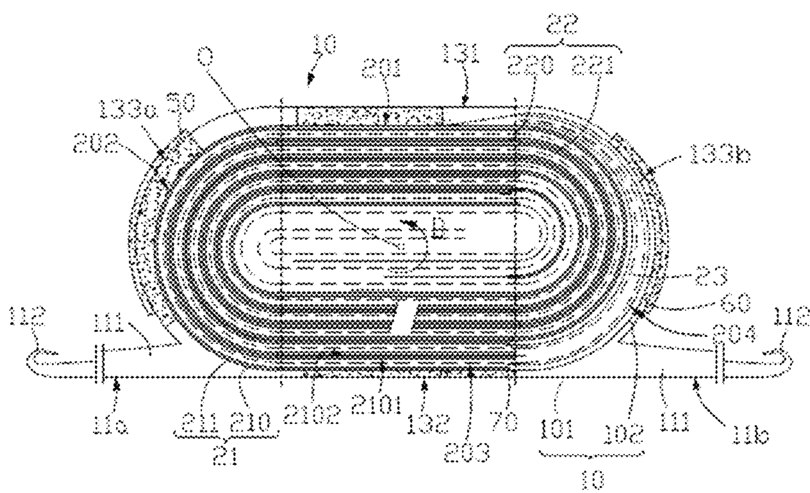
FIG. 9 is a sectional view of a first portion of the electrochemical device shown in FIG. 8 after first-time bending.
Figure 9:

Referring to FIG. 7 to FIG. 9 together, after sealing, the first portion 11*a* is bent twice to form a double-folded structure. FIG. 7 and FIG. 8 show structures with the first portion 11*a* unfolded, in which the extension direction of the first portion 11*a* is approximately parallel to the third direction $D_3$. FIG. 9 shows a structure with the first portion bent for a first time, and FIG. 3 shows a structure with the first portion bent for a second time. For example, as shown in FIG. 8, a part of the first portion 11*a* is bent for the first time to protect the metal layer exposed at the edge of the first portion 11*a*, thereby reducing the risk of a short circuit between the exposed metal layer and the outside, and improving safety. Subsequently, as shown in FIG. 3, the first portion 11*a* is bent for the second time and attached to the first sidewall 133*a*. Therefore, as shown in FIG. 3, the first portion 11*a* includes a first seal edge 111 and a second seal edge 112. The first seal edge 111 is connected to the first sidewall 133*a* and the second wall 132. The second seal edge 112 is connected to the first seal edge 111. The second seal edge 112 is disposed between the first seal edge 111 and the first sidewall 133*a*. The second seal edge 112 is formed by the first-time bending, and the first seal edge 111 is formed by the second-time bending. Alternatively, in other embodiments, the bending sequence of the double-folded structure may be: the first portion 11*a* is bent for the first time and attached to the first sidewall 133*a*, and then a part of the first portion 11*a* is bent for the second time, so as to protect the metal layer exposed at the edge of the first portion 11*a*. The sequence of the two bending steps depends on the actual situation, and is not limited in this application.

As shown in FIG. 11 and FIG. 12, in a cross-section perpendicular to the first direction $D_1$ (to be specific, the surface on which the cross-section is located extends in the second direction $D_2$ and the third direction $D_3$), a first connection point A is provided between the first seal edge 111 and the first sidewall 133*a*. The connection point A is a connection point between an outer surface of the first seal edge 111 in opposition to the first sidewall 133*a* and the outer surface of the first sidewall 133*a*. The first sidewall 133*a* extends outward from the first connection point A along the outline of the first sidewall 133*a* to form a first straight line $X_1$. The first straight line $X_1$ intersects the second wall 132 at an intersection 1320. The intersection 1320 is an intersection between the first straight line $X_1$ and the outer surface of the second wall 132. In this application, the first straight line $X_1$ is a boundary line between the first portion 11*a* and the body portion 13 in the cross-section perpendicular to the first direction $D_1$. Therefore, in the cross-section perpendicular to the first direction $D_1$, the intersection 1320 is also a boundary point between the second wall 132 and the other outer surface that is of the first seal edge 111 and that is away from the first sidewall 133*a*. The first glue layer 110 is located in a space defined by the first straight line $X_1$ and the first portion 11*a*. Understandably, during sealing of the first portion 11*a*, the first polymer layer 1013 and the second polymer layer 1023 at the sealing position are fused to form the first glue layer 110, and the first glue layer 110 is extruded to a lower-pressure position (that is, from the second seal edge 112 to the first seal edge 111). Therefore, in the cross-section perpendicular to the first direction $D_1$, the first glue layer 110 may form an angular point 110*a* (that is, a bulge). The angular point 110*a* protrudes toward the interior of the body portion 13. For example, the angular point 110*a* is a most protrusive position at the edge of the first glue layer 110 when the first glue layer 110 is extruded to one side and forms, in the cross-section perpendicular to the first direction $D_1$, a curve protruding toward the interior of the body portion 13. For example, when the first glue layer 110 forms an arc-like edge, the angular point 110*a* may be a point with a smallest radius of curvature at the edge of the first glue layer 110. As shown in FIG. 11, in some embodiments, in the cross-section perpendicular to the first direction $D_1$, the edge of the first glue layer 110 (that is, the angular point 110*a*) is separated from the first straight line $X_1$. As shown in FIG. 12, in other embodiments, the edge of the first glue layer 110 (that is, the angular point 110*a*) may meet the first straight line $X_1$ instead. In some embodiments, when the first sidewall 133*a* is an arc face, the first straight line $X_1$ is a tangent line passing through the first connection point A.

Figure 13:
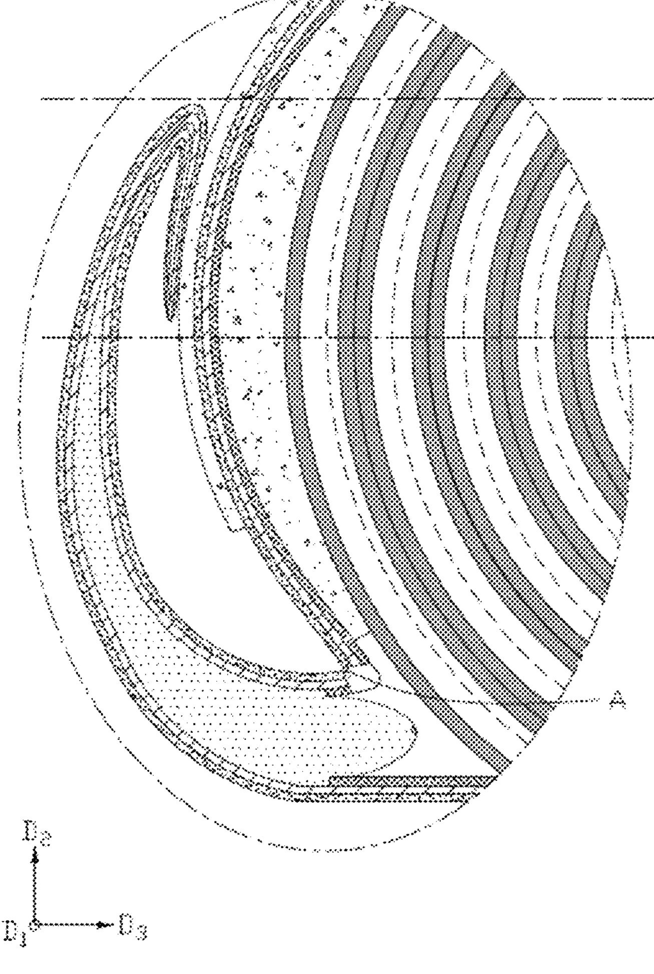
FIG. 13 is a close-up view of the electrochemical device shown in FIG. 3 and ruptured near a first connection point.

As shown in FIG. 13, when the first housing part and the second housing part are fitted and sealed together to form the first portion, the extension direction of the sidewall changes at the junction between the sidewall and the first portion (that is, the first connection point A). Therefore, after the first portion is bent, the degree of change in the extension direction at the first connection point A further increases, so that the first connection point A protrudes toward the interior of the body portion. Therefore, the first connection point A is prone to stress concentration during mechanical abuse, and is at risk of rupturing the housing to cause electrolyte leakage and shorten the lifespan of the electrochemical device. Moreover, the hardness of the first glue layer formed by fusion is relatively high, and the first connection point Ais relatively close to the first glue layer, so that the bendability of the housing near the first connection point A is reduced. This also makes the first connection point A prone to stress concentration, resulting in fatigue damage and a rupture of the housing. In addition, the first glue layer is prone to thrust to the electrode assembly to cause stress concentration at a contact position between the first glue layer and the electrode assembly, thereby damaging the electrode assembly or deteriorating cycle performance (for example, the stress concentration at the contact position causes an active material layer to fall off the surface of the current collector, thereby resulting in a micro-short-circuit and aggravating self-discharge). By limiting the boundary of the first glue layer 110, this application reduces the impact force of the first glue layer 110 on the first connection point A during mechanical abuse, thereby reducing the risk of rupturing at the first connection point A and improving the mechanical strength of the first portion 11*a*. In addition, this reduces the risk of the first glue layer 110 thrusting to the electrode assembly 20 during mechanical abuse, and improves the cycle performance and longevity of the electrochemical device 100. In addition, by limiting the boundary of the first glue layer 110, this application alleviates the problem that the protruding first glue layer 110 impedes the electrode assembly 20 from residing in a seat during packaging.

Figure 14:
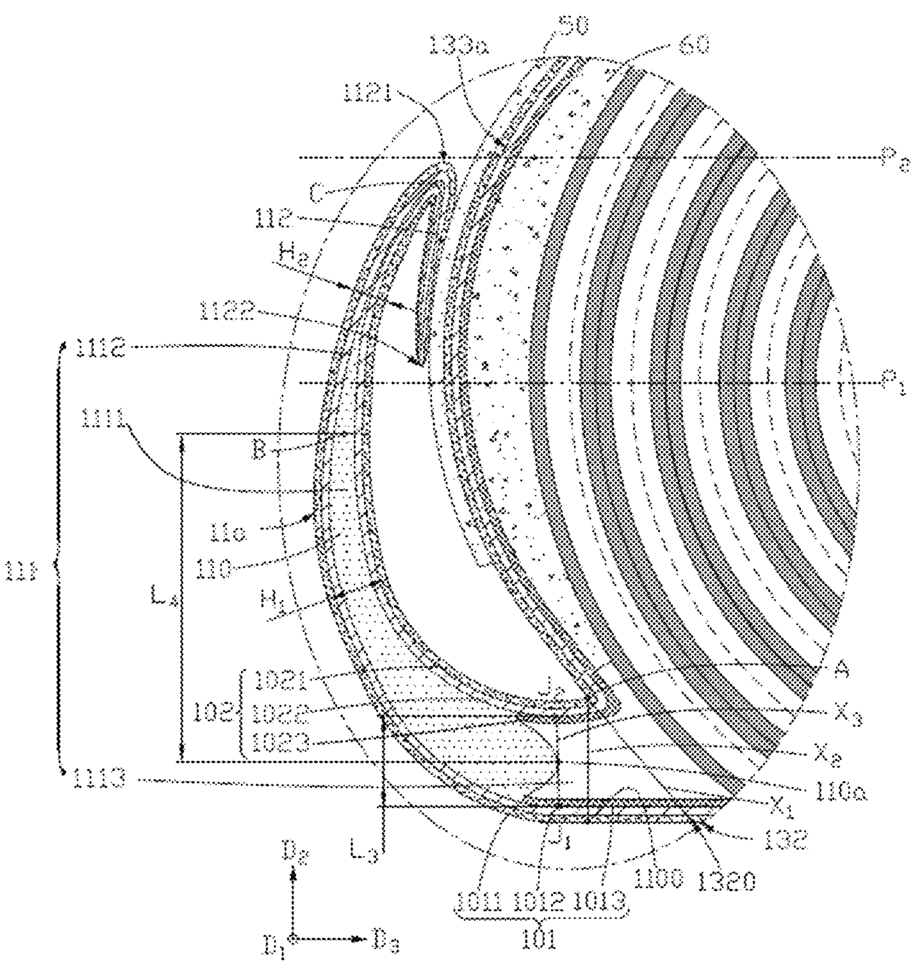
FIG. 14 is a close-up view of the electrochemical device shown in FIG. 3 according to other embodiments.
Figure 16:
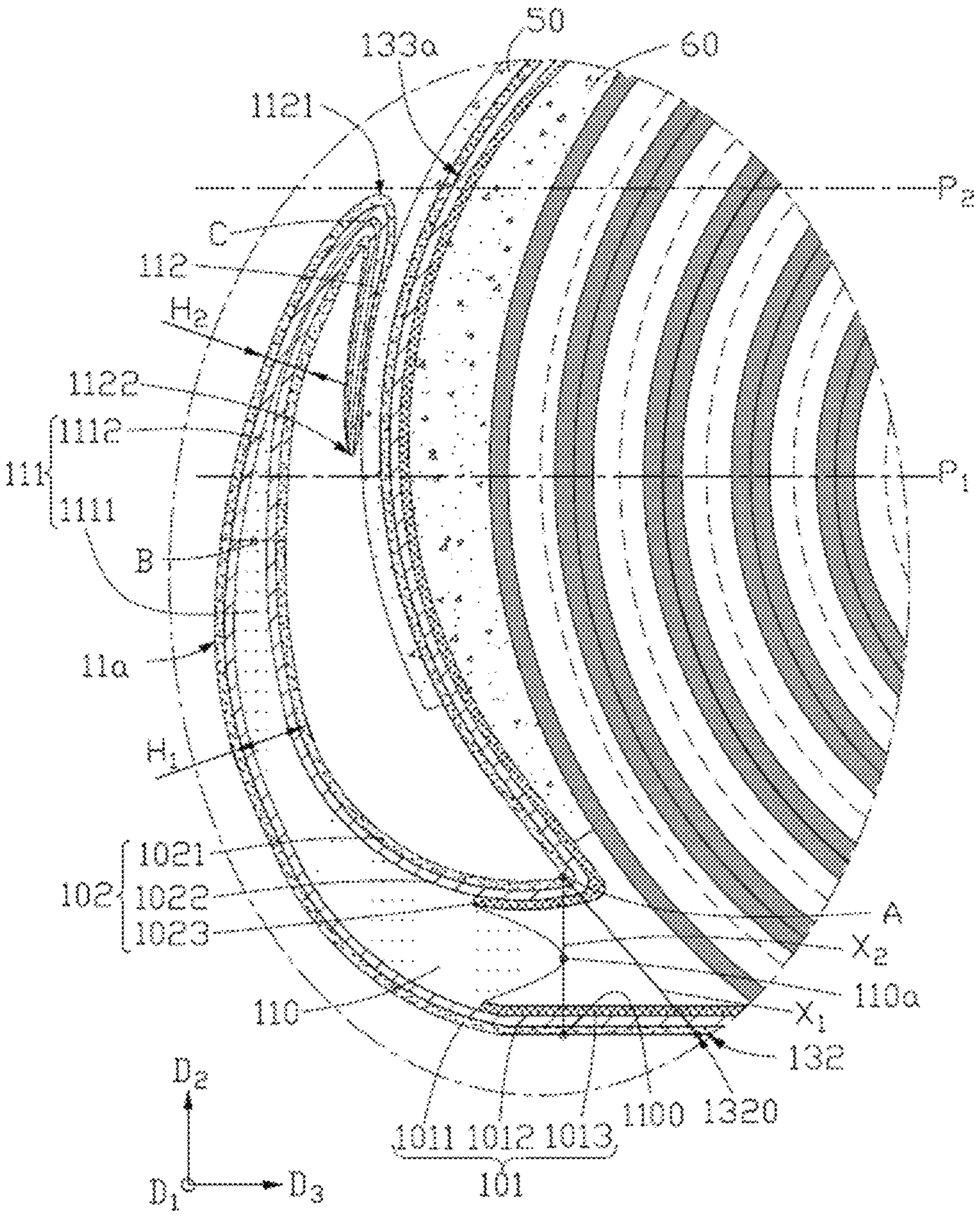
FIG. 16 is a close-up view of the electrochemical device shown in FIG. 3 according to other embodiments.

As shown in FIG. 14 and FIG. 16, in other embodiments, when the edge of the first glue layer 110 is separated from the first straight line $X_1$, a straight line passing through the first connection point A and extending along the second direction $D_2$ is defined as a second straight line $X_2$. At an intersection 1100, the second straight line $X_2$ intersects the outer surface that is of the first portion 11*a* and that is away from the first sidewall 133*a*. The first glue layer 110 is located in a space defined by the second straight line $X_2$ and the first portion 11*a*. As shown in FIG. 14, in some embodiments, the edge of the first glue layer 110 is separated from the second straight line $X_2$. As shown in FIG. 16, in other embodiments, the edge of the first glue layer 110 may meet the second straight line $X_2$ instead. By limiting the boundary of the first glue layer 110, this application further reduces the impact force of the first glue layer 110 on the first connection point A during mechanical abuse, and further reduces the risk of the first glue layer 110 thrusting to the electrode assembly 20. In addition, with the first glue layer 110 being not beyond the second straight line $X_2$, a buffer space available for accommodating the electrolyte solution is formed between the first straight line $X_1$, the second straight line $X_2$, and the second wall 132. Therefore, in the event of mechanical abuse, the buffer space can reduce the probability of the electrolyte solution directly impacting the first glue layer 110, thereby reducing the risk of leakage of the electrolyte solution that bursts the first portion 11*a*, and improving safety.

As shown in FIG. 3, in some embodiments, a sum of the length $L_1$ of the first seal edge 111 and the length $L_2$ of the second seal edge 112 in the second direction $D_2$ is L, the thickness of the electrode assembly 20 along the second direction $D_2$ is H, and ¾H≤L≤5/4H. The length L falling within the range specified in this application alleviates the decline in the sealing strength of the first portion 11$a$ caused by a deficient value of L, and in turn, reduces the risk of bursting the first portion 11$a$ by the electrode assembly 20 or electrolyte solution; and also alleviates the problems of cost increase and energy density decline that may be caused by an excessive value of L.

With respect to measurement of dimensions in this application such as the thickness H of the electrode assembly 20, the length $L_1$ of the first seal edge 111, and the length $L_2$ of the second seal edge 112, a plurality of sample points may be measured and averaged out.

As shown in FIG. 11, FIG. 12, FIG. 14, and FIG. 16, in some embodiments, the second seal edge 112 includes a first end 1121 connected to the first seal edge 111 and a second end 1122 disposed opposite to the first end 1121. The first end 1121 is a bend of the second seal edge 112 against the first seal edge 111. The second end 1122 is an ending that is of the first portion 11$a$ and that is away from the first sidewall 133$a$, and is a position at which the first metal layer 1012 and the second metal layer 1022 are exposed in the first portion 11$a$. The position of the second end 1122 reflects the length of the second seal edge 112 in the second direction $D_2$. It is defined that the electrode assembly 20 has a first plane $P_1$ perpendicular to the second direction $D_2$. The first plane $P_1$ is a virtual plane. In the second direction $D_2$, thicknesses of the electrode assembly between two sides of the first plane $P_1$ are equal. That is, the first plane $P_1$ is a center plane of the electrode assembly 20 in the second direction $D_2$. The first plane $P_1$ is located between the second end 1122 and the second wall 132. By limiting the position of the second end 1122 of the second seal edge 112, this application reduces the risk of detaching the first portion 11$a$ from the first sidewall 133$a$ when the second end 1122 is located at a relatively low position (that is, the second seal edge 112 is relatively long).

As shown in FIG. 11, FIG. 12, FIG. 14, and FIG. 16, in some embodiments, during sealing of the first portion 11$a$, the first polymer layer 1013 and the second polymer layer 1023 at the sealing position are fused to form a first glue layer 110. The first glue layer 110 is extruded to a position on a lower-pressure side to form an overflow region thicker than a main sealing region. That is, the first seal edge 111 includes a first region 1111 (that is, the overflow region) and a second region 1112 (that is, the main sealing region). The second region 1112 is a region that is in direct contact with the seal head and formed by being hot-pressed by the seal head directly. The first region 1111 is a region in which the first glue layer 110 is extruded to overflow. The second region 1112 is connected between the first region 1111 and the second seal edge 112. The sealing strength of the first region 1111 is less than the sealing strength of the second region 1112. Along the extension direction from the first seal edge 111 to the second seal edge 112, the length of the second region 1112 is generally less than the length of the first region 1111. In some embodiments, along the extension direction from the first seal edge 111 to the second seal edge 112, the thickness $H_1$ of the first region 1111 may gradually decrease (that is, $H_1$ is not constant), and the thickness $H_2$ of the second region 1112 may gradually decrease (that is, $H_2$ is not constant), and the thickness $H_1$ of the first region 1111 is greater than the thickness $H_2$ of the second region 1112 (that is, the content of the first glue layer 110 per unit length of the first region 1111 is higher than the content of the first glue layer 110 per unit length of the second region 1112). In other embodiments, the first region 1111 may be a region that is in contact with the seal head during hot pressing, without being limited in this application. For example, the seal head is a special-shaped head, the distance between an upper head and a lower head configured to seal the first region 1111 is relatively great, and the upper head and the lower head may also perform hot pressing directly to form the first region 1111 with a relatively great thickness.

In some specific embodiments, along the extension direction from the second seal edge 112 to the first seal edge 111, the change in thickness of the second region 1112 is less than or equal to 10 μm, and the change in thickness of the first region 1111 is greater than 10 μm. In other words, the change in thickness of the second region 1112 is relatively gentle, but the change in thickness of the first region 1111 is greater than that of the second region 1112. The change in thickness is defined as: a thickness increment between two opposite ends of the first region 1111 or the second region 1112 along the extension direction from the second seal edge 112 to the first seal edge 111. A boundary line between the first region 1111 and the second region 1112 may be determined according to the following steps: obtaining a cross-sectional view of the electrochemical device 100, measuring the thickness in the cross-sectional view, selecting sample points on the first seal edge 111 at preset intervals by starting from the first end 1121, and determining the thickness of the first seal edge 111 at each sample point; determining, when a difference between the thickness at a sample point and the thickness of the first end 1121 is less than 10 μm, that the sample point belongs to the second region 1112; subsequently, keeping selecting a next sample point at preset intervals until the difference between the thickness of the first seal edge 111 at the selected sample point and the thickness of the first end 1121 is equal to m, and then stopping the sampling. At this time, the range from the first end 1121 to the selected sample point is the second region 1112, and the remaining range of the first seal edge 111 is the first region 1111.

Understandably, during sealing of the first portion 11$a$, after the first polymer layer 1013 and the second polymer layer 1023 at the sealing position are fused to form the first glue layer 110, the first glue layer 110 may be extruded to the second end 1122 of the second seal edge 112. In this way, the second seal edge 112 may also form a relatively thick overflow region at the second end 1122. The overflow region of the first seal edge 111 is separated from the overflow region of the second seal edge 112. The overflow region of the second seal edge 112 is not considered in determining the ranges of the first region 1111 and the second region 1112.

As shown in FIG. 11, FIG. 12, FIG. 14, and FIG. 16, in the cross-section perpendicular to the first direction $D_1$, a second connection point B is provided between the first region 1111 and the second region 1112. The second connection point B is a point selected from the boundary line between the first region 1111 and the second region 1112. The position of the second connection point B reflects the lengths of the first region 1111 and the second region 1112 in the second direction $D_2$. In some embodiments, the second connection point B is located between the first plane $P_1$ and the second wall 132. By limiting the position of the second connection point B, the first region 1111 in the second direction $D_2$ is downsized, and the second region 1112 with greater sealing strength is upsized in the second direction $D_2$, thereby increasing the sealing strength of the first portion 11$a$, thereby reducing the risk of leakage of the electrolyte solution that bursts the first portion 11$a$, and improving safety.

In some embodiments, in the cross-section perpendicular to the first direction $D_1$, a third connection point C is provided between the second region 1112 and the second seal edge 112. The third connection point C is a bend point between the second region 1112 and the first region 1111, and is an intersection between the first end 1121 and the first region 1111 in the cross-section. The position of the third connection point C also reflects the length of the second seal edge 112 in the second direction $D_2$. It is defined that the electrode assembly 20 further has a second plane $P_2$ perpendicular to the second direction $D_2$. The second plane $P_2$ is a virtual plane. In the second direction $D_2$, the electrode assembly 20 thickness located between the second plane $P_2$ and the second wall 132 is ¾ of a total thickness of the electrode assembly 20. In the second direction $D_2$, the third connection point C is located between the second plane $P_2$ and the second wall 132. That is, in the second direction $D_2$, the third connection point C is located at a position not higher than ¾ of the total thickness of the electrode assembly 20, thereby reducing the risk of detaching the first portion 11*a* from the first sidewall 133*a* when the third connection point C is located at a relatively high position (that is, the second seal edge 112 is relatively long).

As shown in FIG. 14, when the edge of the first glue layer 110 is separated from the first straight line $X_1$, the first seal edge 111 further includes a third region 1113. The first region 1111 is connected between the second region 1112 and the third region 1113. The first polymer layer 1013 in the third region 1113 is not bonded to the second polymer layer 1023. That is, the first glue layer 110 formed by fusing the first polymer layer 1013 and the second polymer layer 1023 together is not disposed in the third region 1113. In this case, the angular point 110*a* protrudes toward the third region 1113. For the detailed positions of the first region 1111 and the third region 1113, refer to FIG. 15A.

Figure 15A:
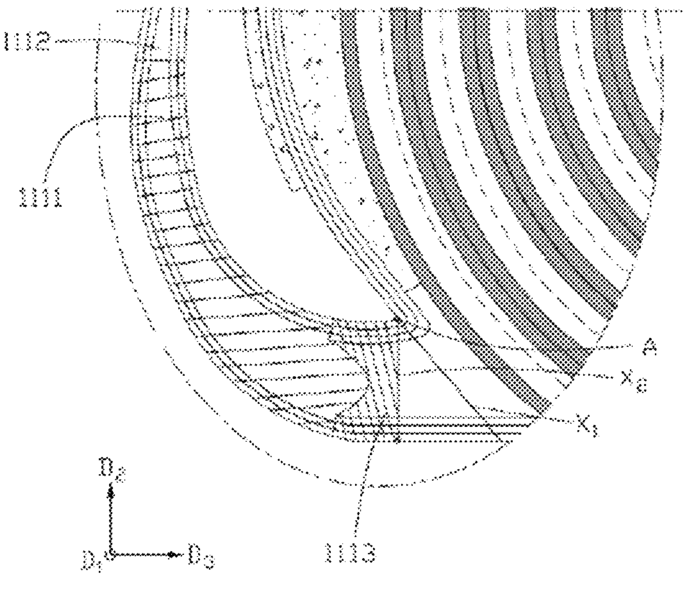
FIG. 15A is a schematic diagram of a first region and a third region of a first seal edge of the electrochemical device shown in FIG. 14.

As shown in FIG. 14 and FIG. 15A, a straight line passing through the first connection point A and extending along the second direction $D_2$ is defined as a second straight line $X_2$, and the third region 1113 is disposed on a side that is of the second straight line $X_2$ and that is away from the electrode assembly 20. The third region 1113 disposed further reduces the impact force of the first glue layer 110 on the first connection point A during mechanical abuse, and further reduces the risk of the first glue layer 110 thrusting to the electrode assembly 20. In addition, the third region 1113 forms a buffer space available for accommodating the electrolyte solution. Therefore, in the event of mechanical abuse, the buffer space can further reduce the probability of the electrolyte solution directly impacting the first glue layer 110, thereby reducing the risk of leakage of the electrolyte solution that bursts the first portion 11*a*, and improving safety.

Figure 15B:
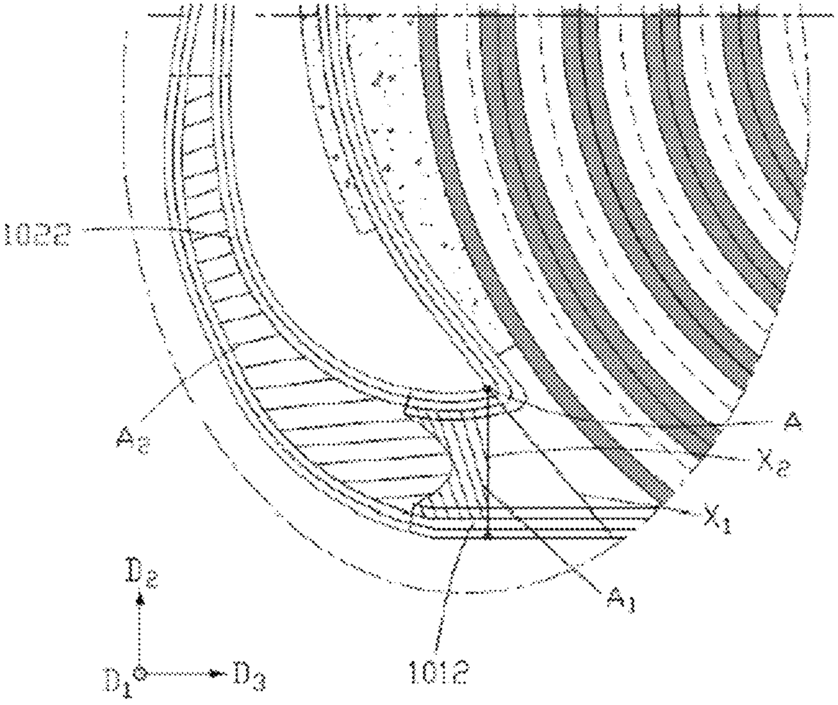
FIG. 15B is a schematic diagram of an area of a part that is of the third region and that is located between the first metal layer and the second metal layer as well as an area of a part that is of the first region and that is located between the first metal layer and the second metal layer, where the first region and the third region are shown in FIG. 15A.

Referring to FIG. 15B together, in some embodiments, in the cross-section perpendicular to the first direction $D_1$, an area of a part that is of the third region 1113 and that is located between the first metal layer 1012 and the second metal layer 1022 is $A_1$, an area of a part that is of the first region 1111 and that is located between the first metal layer 1012 and the second metal layer 1022 is $A_2$, and $0.5 \le A_1/A_2 \le 3$. The ratio of $A_1$ to $A_2$ falling within the range specified in this application avoids a deficient ratio of $A_1$ to $A_2$ (that is, a relatively large overflow region) that makes it difficult to bend the first portion 11*a* at a junction between the first portion and the first sidewall 133*a*. In addition, after the first portion is bent, the electrochemical device 200 is downsized in the third direction $D_3$, thereby increasing a volumetric energy density. The ratio falling within the range specified in this application also avoids an excessive ratio of $A_1$ to $A_2$ (that is, the main sealing region is relatively large) that poses a risk of reducing the sealing strength of the first portion 11*a*. Optionally, in some embodiments, $1 \le A_1/A_2 \le 2$. With the ratio falling within such a range, the first portion 11*a* has relatively high sealing strength, and the junction between the first portion and the first sidewall 133*a* is easily bendable. $A_1$ may be measured by an image method, including the following steps: taking a cross-section of the first portion 11*a* along a cross-sectional direction perpendicular to the first direction $D_1$, and acquiring an image from the first direction $D_1$, where the image includes the cross-section and is denoted as a first image; acquiring an image of a reference target with a known area $S_0$, denoted as a second image; calculating the number of pixels $n_1$ corresponding to the third region 1113 in the first image, and calculating the number of pixels $n_0$ corresponding to the reference target in the second image; and calculating the area $A_1$ of the third region 1113 based on the area $A_0$, the number $n_1$, and the number $n_0$ according to the formula: $A_1=(S_0 \times n_0)/n_1$. Similarly, $A_2$ can also be determined by the image method.

As shown in FIG. 14, in some embodiments, in the cross-section perpendicular to the first direction $D_1$, the third straight line $X_3$ passes through the angular point 110*a* and is parallel to the second straight line $X_2$. At a first intersection $J_1$, the third straight line $X_3$ intersects a boundary line between the first metal layer 1012 of the first seal edge 111 and the first polymer layer 1013. At a second intersection $J_2$, the third straight line $X_3$ intersects a boundary line between the second metal layer 1022 of the first seal edge 111 and the second polymer layer 1023. A distance between the first intersection $J_1$ and the second intersection $J_2$ is $L_3$ (representing a maximum value of the thickness $H_1$ of the first region 1111 along the extension direction from the first seal edge 111 to the second seal edge 112). In the second direction $D_2$, a distance from the angular point 110*a* to the boundary line between the first region 1111 and the second region 1112 is $L_4$ (representing the length of the first region 1111 in the second direction $D_2$), and $0.1 \le L_3/L_4 \le 0.6$. In some embodiments, in the cross-section perpendicular to the first direction $D_1$, the distances from the angular point 110*a* to two sides of the first seal edge 111 may be identical. In this case, the third straight line $X_3$ is perpendicular to either side of the first seal edge 111. The $L_3/L_4$ ratio falling with the range specified in this application avoids a deficient ratio of $L_3$ to $L_4$ (that is, a relatively small thickness of the first region 1111) or an excessive ratio of $L_3$ to $L_4$ (that is, a relatively small length of the first region 1111) that leads to insufficient heat sealing in the second region 1112, thereby increasing the sealing strength of the first portion 11*a*. Optionally, in some specific embodiments, $0.3 \le L_1/L_2 \le 0.5$. With the ratio falling within such a range, the first portion 11*a* has relatively high sealing strength. $L_3$ and $L_4$ may be measured by a direct measurement method, including the following steps: taking a cross-section of the first portion 11*a* along the cross-sectional direction perpendicular to the first direction $D_1$, marking positions $L_3$ and $L_4$ in the cross-section according to the foregoing method, and measuring $L_3$ and $L_4$ directly by using calipers or another appropriate instrument, or acquiring an image of the cross-section and measuring in the image.

As shown in FIG. 3, in some embodiments, the electrochemical device 100 further includes a first bonding piece 50. The first bonding piece 50 bonds the second seal edge 112 and the outer surface of the first sidewall 133*a*, thereby fastening the second seal edge 112 to the first sidewall 133*a*, and further reducing the risk of detaching the first portion 11*a*. The first bonding piece 50 may be double-sided tape or hot-melt adhesive, and the first bonding piece 50 is applied continuously. The material of a bonding layer in the double-sided tape may be one or more selected from acrylate, polyurethane, rubber, or silicone. The hot-melt adhesive may be one or more selected from polyolefin hot-melt adhesive, polyurethane hot-melt adhesive, hot-melt adhesive of ethylene or a copolymer thereof, polyester hot-melt adhesive, polyamide hot-melt adhesive, hot-melt adhesive of styrene or a block copolymer thereof, without being limited in this application.

The electrochemical device 100 may further include a second bonding piece 60. The second bonding piece 60 is configured to bond at least the inner surface of the first sidewall 133*a* to the electrode assembly 20, so as to fasten the electrode assembly 20 in the housing 10. This reduces the risk of wobbling of the electrode assembly 20 in the housing 10 in the third direction $D_3$ during mechanical abuse, and in turn, reduces the impact of the electrode assembly 20 on the first portion 11*a* of the housing 10, and improves safety. The second bonding piece 60 may be double-sided tape or hot-melt adhesive. As shown in FIG. 3, in some specific embodiments, the number of the second bonding pieces 60 is two, and the two bonding pieces bond the inner surfaces of the first sidewall 133*a* and the second sidewall 133*b* respectively.

The electrochemical device 100 may further include a third bonding piece 70. The third bonding piece 70 is configured to bond the inner surface of at least one of the first wall 131 or the second wall 132 to the electrode assembly 20. This reduces the risk of wobbling of the electrode assembly 20 in the housing 10 in the second direction $D_2$ during mechanical abuse, and in turn, reduces the impact of the electrode assembly 20 on the second portion 12*a* of the housing 10, and improves safety. The third bonding piece 70 may be double-sided tape or hot-melt adhesive. As shown in FIG. 3, in some specific embodiments, the number of the third bonding pieces 70 is two, and the two bonding pieces bond the inner surface of the first wall 131 and the inner surface of the second wall 132 respectively.

As shown in FIG. 2, in some embodiments, in the second direction $D_2$, the second portion 12*a* is closer to the second wall 132 than the first wall 131. In the second direction $D_2$, the first end wall 134 includes a first end face 1341 and a second end face 1342 that are located on two sides of the first tab 30 respectively. The first end face 1341 is connected to the second portion 12*a* and the first wall 131, and the second end face 1342 is connected to the second portion 12*a* and the second wall 132. In other words, the first end face 1341 is a deep pit face, and the second end face 1342 is a shallow pit face.

Further, the electrochemical device 100 may further include a fourth bonding piece 80. The fourth bonding piece 80 is configured to bond the first end face 1341 to the edge of the second portion 12*a*. In this way, the fourth bonding piece 80 may be configured to cover a metal layer exposed at the edge of the second portion 12*a*, thereby improving safety. Understandably, the third bonding piece 70 does not cover the entire edge of the second portion 12*a*, so that the first tab 30 and the second tab 40 can still protrude from the edge of the second portion 12*a*. The fourth bonding piece 80 may be single-sided tape, double-sided tape, or hot-melt adhesive. The material of a bonding layer in the single-sided tape may be one or more selected from acrylate, polyurethane, rubber, or silicone, without being limited in this application.

As shown in FIG. 3, in some embodiments, the first current collector 210 includes a first surface 2101 and a second surface 2102 that are disposed opposite to each other. When the electrode assembly 20 is of a wound structure, the outer surface of an outermost circle of the electrode assembly 20 is the first surface 2101. Therefore, the first surface 2101 being the outer surface reduces the probability of detachment of an active material disposed on the outer surface of the electrode assembly 20 even if the electrode assembly 20 is impacted by the first glue layer 110 during mechanical abuse. Moreover, the first current collector 210 can increase hardness of the electrode assembly 20 and serve to protect the electrode assembly 20.

Figure 17:
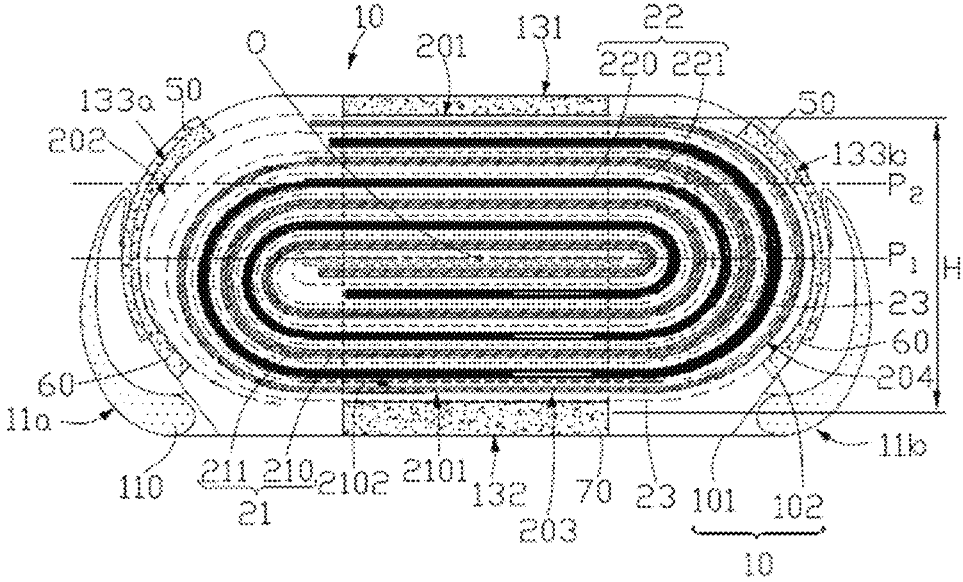
FIG. 17 is a sectional view of an electrochemical device according to other embodiments.
Figure 17:
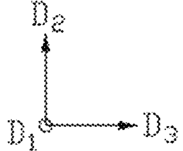

Referring to FIG. 17, another embodiment of this application further provides an electrochemical device 200. The electrochemical device in this embodiment differs from the electrochemical device 100 in that the outermost circle of the electrode assembly 20 is a separator 23. In this embodiment, the separator 23 is extended, so that the electrode plate ends with the separator 23. Due to relatively high roughness, the separator 23 can increase friction between the electrode assembly 20 and the housing 10, thereby increasing a bonding force between the electrode assembly 20 and the first bonding piece 50 or second bonding piece 60, and in turn, fixing the electrode assembly 20 in the housing 10 more firmly. In addition, the separator 23 can form a protection layer to avoid short-circuit hazards caused by wear and tear of the electrode plate inside this part of separator 23 and increase the capability of the electrode assembly 20 in resisting mechanical shocks.

The electrochemical device 100 (or electrochemical device 200) according to this application includes any device capable of electrochemical reactions. Specifically, the electrochemical device 100 includes all types of primary batteries, secondary batteries, fuel cells, solar cells, and capacitors (such as supercapacitors). Optionally, the electrochemical device 100 may be a lithium secondary battery, including a lithium metal secondary battery, a lithium-ion secondary battery, a lithium polymer secondary battery, and a lithium-ion polymer secondary battery.

Figure 18:
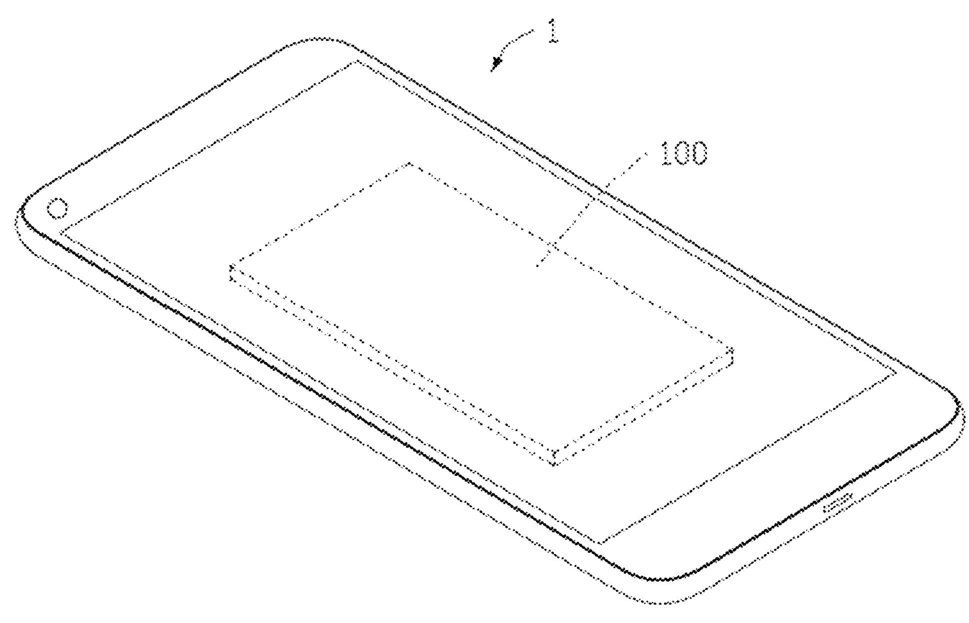
FIG. 18 is an overall schematic structural diagram of an electronic device according to an embodiment of this application.

Referring to FIG. 18, an embodiment of this application further provides an electronic device 1. The electronic device 1 includes the electrochemical device 100 (or electrochemical device 200).

The electrochemical device 100 according to this application is applicable to electronic devices 1 for use in various fields. In an embodiment, the electronic device 1 according to this application may be, but is not limited to: a notebook computer, a pen-inputting computer, a mobile computer, an e-book player, a portable phone, a portable fax machine, a portable photocopier, a portable printer, a stereo headset, a video recorder, a liquid crystal display television set, a handheld cleaner, a portable CD player, a mini CD-ROM, a transceiver, an electronic notepad, a calculator, a memory card, a portable voice recorder, a radio, a backup power supply, a motor, a car, a motorcycle, a power-assisted bicycle, a bicycle, a lighting appliance, a toy, a game machine, a watch, an electric tool, a flashlight, a camera, a large household battery, a lithium-ion capacitor, and the like.

The following describes this application in detail with reference to specific embodiments and comparative embodiments. This application is described below with reference to a specific preparation process and a test method using a pouch-type battery as an example of the electrochemical device. A person skilled in the art understands that the preparation method described in this application is merely an example. Any other appropriate preparation methods fall within the scope of this application.

Embodiment 1

(1) Preparing a negative electrode plate: Mixing artificial graphite as a negative active material, conductive carbon black (Super P), and the styrene butadiene rubber (SBR) at a weight ratio of 96:1.5:2.5, adding deionized water as a solvent, blending the mixture into a slurry in which a solid content is 70 wt %, and stirring well. Coating one surface of a 10-μm-thick negative current collector copper foil evenly with the slurry, and drying the slurry at a temperature of 110° C. to obtain a negative electrode plate coated with a 150-μm-thick negative active material layer on one side. Repeating the foregoing steps on the other surface of the negative electrode plate to obtain a negative electrode plate coated with the negative active material layer on both sides.

(2) Preparing a positive electrode plate: Mixing lithium cobalt oxide ($LiCoO_2$) as a positive active material, conductive carbon black (super P), and polyvinylidene difluoride (PVDF) at a weight ratio of 97.5:1.0:1.5, adding N-methyl pyrrolidone (NMP) as a solvent, blending the mixture into a slurry in which a solid content is 75 wt %, and stirring well. Coating a 12 μm-thick positive current collector aluminum foil evenly with the slurry, and drying the slurry at a temperature of 90° C. to obtain a positive electrode plate coated with a 100-μm-thick positive active material layer on one side. Repeating the foregoing steps on the other surface of the positive current collector aluminum foil to obtain a positive electrode plate of which both sides are coated with the positive active material layer.

(3) Preparing an electrolyte solution: Mixing ethylene carbonate (EC), ethyl methyl carbonate (EMC), and diethyl carbonate (DEC) at a weight ratio of EC:EMC:DEC=30:50:20 in an dry argon atmosphere to form an organic solvent, then adding lithium salt hexafluorophosphate ($LiPF_6$) into the organic solvent to dissolve, and mixing well to obtain an electrolyte solution in which a lithium salt concentration is 1.15 mol/L.

(4) Preparing an electrode assembly: Stacking the double-side-coated negative electrode plate, the separator, and the double-side-coated positive electrode plate in sequence, and winding the structure to form an electrode assembly with a thickness of H. The electrode assembly includes a positive tab and a negative tab. The positive tab is made of aluminum (Al), the negative tab is made of nickel (Ni), and the two tabs are disposed side by side. The separator is a 15-μm-thick polyethylene (PE) film.

(5) Assembling the electrode assembly: Putting the punch-molded aluminum plastic film (150 μm thick) in an assembly jig, with the pit side upward. Putting the electrode assembly into the pit, with the separator side upward. Applying a tab adhesive to a region corresponding to the tabs of the electrode assembly and located at the edge of the aluminum plastic film.

(7) Electrolyte injection and sealing: Injecting the electrolyte solution into the pit of the aluminum plastic film, and leading all the tabs of the electrode assembly out of the aluminum plastic film. Applying a pressure at the edge of the aluminum plastic film by using the seal head of a sealing device, so as to form the first portion. The sum L of the lengths of the first seal edge and the second seal edge of the first portion is equal to the thickness H of the electrode assembly.

(8) Edge folding: Bending the first portion twice to form a double-folded structure to obtain a battery. Taking the battery in Embodiment 1, taking a cross-section of the battery along the cross-sectional direction perpendicular to the first direction $D_1$, and measuring the area. The area $A_1$ of the third region and the area $A_2$ of the first region satisfy: $A_1/A_2=0.4$. The distance from the first intersection to the second intersection is $L_3$, the distance from the angular point to a boundary line between the first region and the second region is $L_4$, and the distance satisfies: $L_3/L_4=0.3$. The position of the second connection point between the first region and the second region is below the first face.

Embodiments 2 to 7 and Comparative Embodiment 1

Differences from Embodiment 1 lie in the range of the first glue layer, the relationship between L and H, and/or the location of the second connection point. The temperature or pressure of the seal head is controlled to adjust the range of the first glue layer. The width of the seal head is adjusted to adjust L, so as to adjust the relationship between L and H. The position of the bend between the first seal edge and the second seal edge is adjusted to adjust the position of the second connection point.

Subsequently, a slight drop test, a drop test, a tumbling test, a sealing strength test, and an energy density test are performed on the batteries in each embodiment and comparative embodiment separately. The batteries in each embodiment and each comparative embodiment are tested in groups, each group containing 10 batteries. The corresponding test results are recorded in Table 1.

The steps of a slight drop test include: 1) Discharging the battery at a constant current of 0.2 C in a 25° C. environment until the State of Charge (SOC) reaches 0%. Leaving the battery to stand for 5 minutes. Charging the battery at a constant current of 0.5 C until the SOC reaches 50%, and then charging the battery at a constant voltage until the current reaches 0.05 C. Leaving the battery to stand for 5 minutes, and measuring the voltage and internal resistance of the battery. 2) Putting the battery into a jig chamber. Dropping the battery with the bottom, left side, right side, front, back, and top of the battery facing downward in sequence separately from a 10 cm height to a steel sheet by using an automatic drop device, thereby completing one round of test. Dropping the battery for 100 rounds (equivalent to 600 times) to complete one round, and testing the battery for a total of 3 rounds. 3) Carrying out a slight drop test for the battery with the front side and back side facing downward separately. Dropping the battery for a total of 500 rounds (equivalent to 1000 times) to complete one round, and testing the battery for a total of 3 rounds. 4) Putting the battery subjected to the slight drop test in an environment with a temperature of (60±3°) C and a relative humidity of 90%. Leaving the battery to stand for 14 days, and checking whether the first connection point is ruptured or leaks electrolyte, and recording the voltage and internal resistance of the battery. If the voltage drop is less than 0.2 V and the first connection point is not ruptured, it is determined that the battery passes the slight drop test.

The steps of a drop test include: 1) Putting the battery into a jig chamber, changing drop height to 1.8 μm, and dropping the jig chamber with the battery from a height of 1.8 μm to a steel sheet by using an automatic drop device, with the bottom, left side, right side, front, back, and top of the jig chamber facing downward in sequence separately, thereby completing one round of test. Dropping the battery for 3 rounds (equivalent to 18 times) to complete one round. 2) Measuring the voltage of the battery upon completion of each round, and stopping the drop test when the battery catches fire or leaks electrolyte, or, if no fire or leakage occurs, continuing the drop test until 3 rounds are completed. 3) Disassembling the battery cell after the drop test is completed. If the first portion is not detached, the first connection point is not ruptured, and the surface of the electrode assembly is not dented, it is determined that the battery passes the drop test.

The steps of the tumbling test include: 1) Charging the battery in a 25° C. environment until the state of charge reaches 100% (that is, fully charged) and the battery voltage reaches 4.4 V. 2) Putting the battery into a jig chamber. Sticking the back of the battery to the jig by using adhesive tape, and then tightening the screws on the jig. Subsequently, putting the jig containing the battery into a tumbling test machine for testing. Upon completion of the testing, leaving the battery to stand for 24 hours. The drum speed is 7 revolutions per minute, the drop height is 1 meter, and the battery is tumbled for 1000 times. A battery that incurs no electrolyte leakage, fire, explosion, or other abnormal phenomena after completion of the tumbling test is deemed having passed the tumbling test.

TABLE 1

| | Boundary of first glue layer | Relationship between L and H | Position of second connection point | Slight drop test pass rate | Drop test pass rate | Tumbling test pass rate |
|---|---|---|---|---|---|---|
| Comparative Embodiment 1 | Beyond first straight line | L = H | Below first face | 0/10 | / | / |
| Embodiment 1 | Not beyond first straight line | L = H | Below first face | 7/10 | 8/10 | 10/10 |
| Embodiment 2 | Not beyond first straight line | L = 1/2H | Below first face | / | 2/10 | / |
| Embodiment 3 | Not beyond first straight line | L = 3/4H | Below first face | / | 5/10 | / |
| Embodiment 4 | Not beyond first straight line | L = 5/4H | Below first face | / | 10/10 | / |
| Embodiment 5 | Not beyond first straight line | L = 3/2H | Below first face | / | 10/10 | / |
| Embodiment 6 | Not beyond first straight line | L = H | Above first face | / | / | 3/10 |
| Embodiment 7 | Not beyond second straight line | L = H | Below first face | 10/10 | / | / |

In Table 1, the slight drop test pass rate 0/10 indicates that 0 of the tested 10 batteries passes the test. The slight drop test pass rate 10/10 indicates that 10 of the tested 10 batteries passes the test. The meanings of other values can be deduced similarly.

As can be seen from the data in Table 1, in contrast to Comparative Embodiment 1, because the first glue layer in Embodiment 1 is not beyond the first straight line, the pass rates in the slight drop test, drop test, and tumbling test are relatively high, and the safety is relatively high.

On the basis that the first glue layer is not beyond the first straight line, both the value of L and the position of the second connection point further affect the test result. In contrast to Embodiments 1, 3, and 4, the value of L in Embodiment 2 is relatively low, and the value of L in Embodiment 5 is relatively low, failing to satisfy $\frac{3}{4}H \le L \le \frac{5}{4}H$, so that the drop test pass rate is relatively low. In contrast to Embodiment 1, the second connection point in Embodiment 6 is located above the first plane, so that the drop test pass rate is relatively low.

On the basis of the first glue layer being not beyond the first straight line, in contrast to Embodiment 1, the first glue layer in Embodiment 7 is not beyond the second straight line, so that the drop test pass rate is relatively high.

Embodiments 8 to 22

Differences from Embodiment 1 lie in the $A_1/A_2$ ratio and the $L_3/L_4$ ratio. The structure of an overflow slot on the seal head may be adjusted to adjust the $A_1/A_2$ ratio and the $L_3/L_4$ ratio.

Subsequently, a sealing strength test and an energy density test are performed on the batteries in each embodiment and comparative embodiment separately. The corresponding test results are recorded in Table 2.

The steps of a sealing strength include: 1) Taking out the first portion from the housing as a specimen 1; 2) cutting the specimen 1 into test strips with a width L of 8 mm, so as to obtain a specimen 2, in which the entire sealing region is fully retained, and the packaging shells on both sides of the sealing region remain intact; 3) tearing apart the housing on two sides at an angle of 180° by using a GoTech tensile testing machine, so that the two layers of housing in the sealing region are separated from each other; and 4) recording a stable tensile force F when the two layers are separated in step 3), and calculating the sealing strength $\sigma = F/L$.

The steps of an energy density test include: 1) Charging the battery at a 1 C rate in a 25° C. environment until the voltage rises from 3.0 V to 4.4 V, and then discharging the battery at a 0.1 C rate until the voltage reaches 3.0 V. Measuring the 0.1 C discharge capacity, and calculating the energy density according to the formula: 0.1 C discharge energy density=0.1 C discharge capacity/volume of the battery.

TABLE 2

| | Boundary of first glue layer | $A_1/A_2$ | $L_3/L_4$ | Sealing strength (N/cm) | Energy density (Wh/L) |
|---|---|---|---|---|---|
| Embodiment 1 | Not beyond Boundary of first glue layer first straight line | 0.4 $A_1/A_2$ | 0.3 $L_3/L_4$ | 17.1 Sealing strength (N/cm) | 649 Energy density (Wh/L) |
| Embodiment 8 | Not beyond first straight line | 0.5 | 0.3 | 17.0 | 655 |
| Embodiment 9 | Not beyond first straight line | 0.8 | 0.3 | 16.8 | 656 |
| Embodiment 10 | Not beyond first straight line | 1.0 | 0.3 | 16.3 | 660 |
| Embodiment 11 | Not beyond first straight line | 1.5 | 0.3 | 16.0 | 665 |
| Embodiment 12 | Not beyond first straight line | 2.0 | 0.3 | 15.7 | 667 |
| Embodiment 13 | Not beyond second straight line | 2.5 | 0.3 | 14.3 | 668 |
| Embodiment 14 | Not beyond first straight line | 3.0 | 0.3 | 12.5 | 670 |
| Embodiment 15 | Not beyond first straight line | 3.2 | 0.3 | 11.6 | 671 |
| Embodiment 16 | Not beyond first straight line | 1.5 | 0.05 | 13.2 | / |
| Embodiment 17 | Not beyond first straight line | 1.5 | 0.1 | 14.8 | / |
| Embodiment 18 | Not beyond first straight line | 1.5 | 0.2 | 15.2 | / |
| Embodiment 19 | Not beyond first straight line | 1.5 | 0.4 | 16.5 | / |
| Embodiment 20 | Not beyond second straight line | 1.5 | 0.5 | 15.7 | / |
| Embodiment 21 | Not beyond first straight line | 1.5 | 0.6 | 15.0 | / |
| Embodiment 22 | Not beyond second straight line | 1.5 | 0.7 | 13.3 | / |

As can be seen from the data in Table 2, in contrast to Embodiment 1 and Embodiment 15, the area ratio in Embodiments 8 to 14 satisfies $0.5 \leq A_1/A_2 \leq 3$, and therefore, both the volumetric energy density and the sealing strength are relatively high. In contrast to Embodiment 16 and Embodiment 22, the distance ratio in Embodiments 17 to 21 satisfies $0.1 \leq L_3/L_4 \leq 0.6$, and therefore, the sealing strength is relatively high.

Finally, it is hereby noted that the foregoing embodiments are merely intended for describing the technical solutions of this application but not intended as a limitation. Although this application is described in detail with reference to the foregoing optional embodiments, a person of ordinary skill in the art understands that modifications or equivalent replacements may be made to the technical solutions of this application without departing from the spirit and scope of the technical solutions of this application.

What is claimed is:

1. An electrochemical device comprising: a housing, an electrode assembly, and a tab;

wherein the housing comprises a body portion and a first portion, the electrode assembly is disposed in the body portion, and the tab is electrically connected to the electrode assembly and protrudes out of the housing in a first direction;

a thickness direction of the electrode assembly is a second direction, and a direction perpendicular to the first direction and the second direction is a third direction;

wherein in the second direction, the body portion comprises a first wall and a second wall disposed opposite to each other, and in the third direction, the body portion comprises a first sidewall and a second sidewall disposed opposite to each other;

the first portion comprises a first seal edge and a second seal edge, the first seal edge is connected to the first sidewall and the second wall, the second seal edge is connected to the first seal edge, and the second seal edge is disposed between the first seal edge and the first sidewall;

the housing comprises a first housing part and a second housing part disposed opposite to each other, the first housing part comprises a first polymer layer and a first metal layer, the second housing part comprises a second polymer layer and a second metal layer, the first polymer layer and the second polymer layer are bonded to form a glue layer, and the glue layer is located in the first portion; and in a cross-section perpendicular to the first direction, a first connection point is provided between the first seal edge and the first sidewall, the first sidewall extends outward from the first connection point along an outline of the first sidewall to form a first straight line, and the glue layer is located in a space defined by the first portion and the first straight line;

wherein the first seal edge comprises a first region, a second region, and a third region; the second region is connected between the first region and the second seal edge, and the first region is connected between the second region and the third region; a thickness of the first region is greater than a thickness of the second region;

the first polymer layer in the third region is not bonded to the second polymer layer;

in the cross-section perpendicular to the first direction, the glue layer in the first region comprises an angular point, and the angular point protrudes toward the third region;

a third straight line is defined parallel to a second straight line passing through the first connection point and extending along the second direction, the third straight line passes through the angular point and intersects a boundary line between the first metal layer of the first seal edge and the first polymer layer to form a first intersection; the third straight line intersects a boundary line between the second metal layer of the first seal edge and the second polymer layer to form a second intersection; and a distance from the first intersection to the second intersection is $L_3$, a distance from the angular point to a boundary line between the first region and the second region is $L_4$, and $0.1 \leq L_3/L_4 \leq 0.6$.

2. The electrochemical device according to claim 1, wherein a straight line passing through the first connection point and extending along the second direction is defined as a second straight line, and the glue layer is located in a space defined by the first portion and the second straight line.

3. The electrochemical device according to claim 1, wherein a sum of a length of the first seal edge and a length of the second seal edge in the second direction is L, a thickness of the electrode assembly in the second direction is H, and $\frac{3}{4}H \le L \le \frac{5}{4}H$.

4. The electrochemical device according to claim 1, wherein the second seal edge comprises a first end connected to the first seal edge and a second end disposed opposite to the first end; and the electrode assembly has a first plane perpendicular to the second direction, and in the second direction, thicknesses of the electrode assembly between two sides of the first plane are equal, and the first plane is located between the second end and the second wall.

5. The electrochemical device according to claim 1, wherein in the cross-section perpendicular to the first direction, a second connection point is provided between the first region and the second region; and the electrode assembly has a first plane perpendicular to the second direction, and in the second direction, thicknesses of the electrode assembly between two sides of the first plane are equal, and the second connection point is located between the first plane and the second wall.

6. The electrochemical device according to claim 1, wherein in the cross-section perpendicular to the first direction, a third connection point is provided between the second region and the second seal edge;

the electrode assembly has a second plane perpendicular to the second direction, and in the second direction, a thickness of the electrode assembly located between the second plane and the second wall is ¾ of a total thickness of the electrode assembly; and in the second direction, the third connection point is located between the second plane and the second wall.

7. The electrochemical device according to claim 1, wherein the first housing part further comprises a first metal layer stacked together with the first polymer layer;

the second housing part further comprises a second metal layer stacked together with the second polymer layer; and in the cross-section perpendicular to the first direction, an area of a part of the third region located between the first metal layer and the second metal layer is $A_1$, an area of a part of the first region located between the first metal layer and the second metal layer is $A_2$, and $0.5 \le A_1/A_2 \le 3$.

8. The electrochemical device according to claim 1 further comprising a first bonding piece configured to bond the second seal edge to an outer surface of the first sidewall.

9. The electrochemical device according to claim 1, further comprising a second bonding piece configured to bond an inner surface of the first sidewall to the electrode assembly.

10. The electrochemical device according to claim 1, further comprising a third bonding piece configured to bond an inner surface of at least one of the first wall or the second wall to the electrode assembly.

11. The electrochemical device according to claim 1, wherein the electrode assembly is of a wound structure;

the electrode assembly comprises a first electrode plate, a second electrode plate, and a separator located between the first electrode plate and the second electrode plate;

the first electrode plate comprises a first current collector and a first active material layer provided on the first current collector; and the first current collector comprises a first surface, and an outer surface of an outermost circle of the electrode assembly is the first surface.

12. The electrochemical device according to claim 1, wherein the electrode assembly is of a wound structure; and the electrode assembly comprises a first electrode plate, a second electrode plate, and a separator located between the first electrode plate and the second electrode plate, and an outermost circle of the electrode assembly is the separator.

13. The electrochemical device according to claim 1, wherein in the first direction, the body portion further comprises a first end wall and a second end wall disposed opposite to each other; the housing further comprises a second portion connected to the first end wall, and the tab protrudes out of the housing from an edge of the second portion.

14. The electrochemical device according to claim 13, wherein in the second direction, the second portion is closer to the second wall than the first wall; and in the second direction, the first end wall comprises a first end face and a second end face located on two sides of the tab respectively, the first end face is connected to the second portion and the first wall, and the second end face is connected to the second portion and the second wall.

15. The electrochemical device according to claim 14, further comprising a fourth bonding piece configured to bond the first end face to the edge of the second portion.

16. The electrochemical device according to claim 1, wherein the first polymer layer comprises a first polymer material, the second polymer layer comprises a second polymer material; and the first polymer material and the second polymer material each are at least one independently selected from polypropylene, a propylene copolymer, polyethylene, or polymethyl methacrylate.

17. An electronic device comprising an electrochemical device; wherein the electrochemical device comprises a housing, an electrode assembly, and a tab; wherein, the housing comprises a body portion and a first portion, the electrode assembly is disposed in the body portion, and the tab is electrically connected to the electrode assembly and protrudes out of the housing in a first direction;

a thickness direction of the electrode assembly is a second direction, and a direction perpendicular to the first direction and the second direction is a third direction;

wherein in the second direction, the body portion comprises a first wall and a second wall disposed opposite to each other, and in the third direction, the body portion comprises a first sidewall and a second sidewall disposed opposite to each other;

the first portion comprises a first seal edge and a second seal edge, the first seal edge is connected to the first sidewall and the second wall, the second seal edge is connected to the first seal edge, and the second seal edge is disposed between the first seal edge and the first sidewall;

the housing comprises a first housing part and a second housing part disposed opposite to each other, the first housing part comprises a first polymer layer and a first metal layer, the second housing part comprises a second polymer layer and a second metal layer, the first polymer layer and the second polymer layer are bonded to form a glue layer, and the glue layer is located in the first portion; and in a cross-section perpendicular to the first direction, a first connection point is provided between the first seal edge and the first sidewall, the first sidewall extends outward from the first connection point along an outline of the first sidewall to form a first straight line, and the glue layer is located in a space defined by the first portion and the first straight line, wherein the first seal edge comprises a first region, a second region, and a third region; the second region is connected between the first region and the second seal edge, and the first region is connected between the second region and the third region; a thickness of the first region is greater than a thickness of the second region;

the first polymer layer in the third region is not bonded to the second polymer layer;

in the cross-section perpendicular to the first direction, the glue layer in the first region comprises an angular point, and the angular point protrudes toward the third region;

a third straight line is defined parallel to a second straight line passing through the first connection point and extending along the second direction, the third straight line passes through the angular point and intersects a boundary line between the first metal layer of the first seal edge and the first polymer layer to form a first intersection; the third straight line intersects a boundary line between the second metal layer of the first seal edge and the second polymer layer to form a second intersection; and a distance from the first intersection to the second intersection is $L_3$, a distance from the angular point to a boundary line between the first region and the second region is $L_4$, and $0.1 \leq L_3/L_4 \leq 0.6$.

* * * * *